United States Patent [19]

Isayama

[11] Patent Number: 5,539,974
[45] Date of Patent: Jul. 30, 1996

[54] METHOD FOR PRODUCING LAMINATED IRON CORES

[75] Inventor: Minao Isayama, Kitakyushu, Japan

[73] Assignee: Mitsui High-Tec, Inc., Japan

[21] Appl. No.: 261,069

[22] Filed: Jun. 16, 1994

[30] Foreign Application Priority Data

Jun. 21, 1993 [JP] Japan .................................. 5-174749

[51] Int. Cl.⁶ ..................................................... H02K 15/02
[52] U.S. Cl. ................................ 29/598; 29/596; 310/42; 310/216
[58] Field of Search ........................... 29/596, 598, 609; 310/216–218, 42

[56] References Cited

FOREIGN PATENT DOCUMENTS 52-120306  10/1977  Japan .
52-138602  11/1977  Japan .
1190235   7/1989  Japan .

*Primary Examiner*—Carl E. Hall
*Attorney, Agent, or Firm*—Greer, Burns & Crain, Ltd.

[57] ABSTRACT

A method for producing laminated iron cores, in which at least one of a semi-stator sheet piece and a semi-rotor sheet piece is subjected to a pressing operation in a sheet thickness direction to be extended inwardly radially and outwardly radially and to make large a blanking width, so that, when the semi-stator sheet piece is subjected at its inner peripheral edge portion to a blanking operation and the semi-rotor sheet piece is subjected at its outer peripheral edge portion to a blanking operation, generation of 'scum riser' phenomenon or the like can be prevented in advance.

12 Claims, 18 Drawing Sheets

METHOD FOR PRODUCING LAMINATED IRON CORES

BACKGROUND OF THE INVENTION

1. Field of the Invention

The present invention relates to a method for producing laminated iron cores which are formed of fixedly stacked stator sheet pieces and rotor sheet pieces obtained by blanking a strip material, and also to the resultant laminated iron cores.

2. Description of the Related Art

For example, such a laminated iron core constituting a stepping motor as a stator S or a rotor R shown in FIG. 22 is produced by sequentially stacking iron core sheet pieces (stator or rotor sheet pieces) of a predetermined shape obtained by blanking a strip material and then by bonding the sheet pieces to each other.

When it is desired to produce a laminated iron core such as the aforementioned stator S or rotor R, there is considered such a method as to blank out the rotor sheet piece by utilizing an inner diameter zone of the stator sheet piece where a hole for accommodating the rotor is formed.

As shown in FIG. 23, however, an air gap a defined between the inner periphery of the stator S and the outer periphery of the rotor R is set to be as extremely small as about 0.02 mm, so that, after the rotor sheet piece is blanked out from the inner diameter zone of the stator sheet piece, a blanking width only as small as the air gap a is left in the inner peripheral edge portion of a semi-stator sheet piece which will be later formed into the stator sheet piece of a predetermined shape.

As a result, when the above semi-stator sheet piece is subjected to a blanking operation at its inner peripheral edge portion to make the above rotor accommodation hole of the predetermine shape, the blanked scrap slug must have a narrow ring shape corresponding to the air gap. However, because of too narrow width, the scrap ring tends to be broken at its several portions and the broken scums or slugs tend to be projected on the surface of the material without falling into a lower punching die, that is, a so-called "scum riser" phenomenon takes place, which disadvantageously results in a faulty product having dimples or the like.

For the purpose of solving such a disadvantage, there has been conventionally employed such a method that rotor and stator sheet pieces are made by blanking respectively different strip materials with use of respectively different dies. In this method, however, in addition to a fact that two die machines and press machines are required for producing the stator and rotor for one type of stepping motor, the yield of the material is also poor which results in production costs being inevitably increased.

Meanwhile, as a conventional technique for overcoming the above-mentioned disadvantage that the blanking gap is narrow, there is suggested a method as disclosed, e.g., in Japanese Patent Application Laid-open No. 1-190235, in which before blanking out the rotor sheet piece from a metal thin plate, a bead-like drawing portion is formed at a location of the metal thin plate having a diameter larger than the diameter of the rotor sheet piece, which drawing portion is flattened to be extended toward the blanked side of the rotor sheet piece after the blanking of the rotor sheet piece, and thereafter, the stator sheet piece is blanked out.

With the above structure, since the metal thin plate is made flat to be extended prior to the blanking of the stator sheet piece, the gap allowance or blanked scrap width can be secured, whereby a scrap piece can fall in each blanking stroke without being broken during the blanking operation, and thus, a twice blanking operation problem can be solved.

However, in the above arrangement, since the drawing portion is made flat by pressing it, there remains wavy undulations on the metal thin plate after subjected to the pressing operation. As a result, there will also remain undulations on the stator sheet piece obtained by blanking the thin plate having the undulations. Thus, a resultant iron core of such laminated stator sheet pieces exhibits an improper shape with an undesirable skew angle. That is, the resultant iron core has a disadvantage that precision in the squareness and parallelism is reduced.

SUMMARY OF THE INVENTION

As explained above, when a strip material, after subjected to a blanking operation to obtain a rotor sheet piece, is subjected to a blanking operation around the hole left therein after the rotor sheet piece is blanked out to obtain a stator sheet piece, the inner peripheral portion of a semi-stator sheet piece with the rotor sheet piece removed therefrom can have a blanking width as extremely small as merely the air gap, which disadvantageously results in that broken blanked-out scum may produce a resultant faulty product, damaged dies, or the like. When the rotor and stator sheet pieces are formed by different die machines in order to solve such a disadvantage, a remarkable increase of the production costs is experienced.

The aforementioned Japanese Patent Application Laid-open No. 1-190235 also has a disadvantage that the shape characteristic of the laminated iron core is inferior for the earlier-mentioned reason. When the shape precision declines, the product may be considered unacceptable, thus decreasing the yield. Further, in order to reduce the step rotational angle to realize accurate rotation control, it is necessary to form a multiplicity of pole teeth on the stator sheet piece. However, when the stator sheet piece has a wavy surface, the pole teeth of the laminated iron core cannot be properly arranged, which may lead to the fact that desired performances cannot be obtained.

In view of the above circumstances, it is an object of the present invention to provide a method for producing laminated iron cores while minimizing any increase of production costs and also to obtain resultant laminated iron cores which are excellent in such shape precision as squareness and parallelism and highly suitable for use in an accurate electric motor.

In accordance with an aspect of the method for producing laminated iron cores of the present invention, the above object is attained in such a manner that, in a first step, a rotor sheet piece having a predetermined shape of an outer periphery is blanked out from an inner diameter zone of a stator sheet piece, in a second step, a semi-stator sheet piece is pressed in a sheet thickness direction to extend an inner periphery radially inwardly, and in a third step, the inner periphery of the semi-stator sheet piece is blanked into a predetermined shape along the entire periphery so as to form the hole for accommodating the rotor.

In accordance with another aspect of the method for producing laminated iron cores of present invention, the above object is attained in such a manner that, in a first step, an inner diameter zone of a stator sheet piece is blanked into a predetermined shape to form a hole for accommodating a rotor and also form a semi-stator sheet piece, in a second step, the semi-stator sheet piece is pressed in a sheet thickness direction to extend an outer periphery radially outwardly and, in a third step, the outer periphery of the semi-stator sheet piece is blanked into a predetermined shape along the entire periphery.

In the present invention, when the rotor sheet piece is blanked out by utilizing the inner diameter zone of the stator sheet piece in which the rotor is to be accommodated, the blanking width can be made large. Thus, when the semi-stator sheet piece is subjected along its inner peripheral edge portion to a blanking operation or the semi-rotor sheet piece is subjected along its outer peripheral edge portion to a blanking operation, the blanked chip can be cut off in the form of a wide and continuous ring and thus generation of a 'scum riser' phenomenon or the like can be prevented in advance.

In other words, in the present invention, since the rotor sheet piece can be blanked out by utilizing the inner diameter zone of the rotor sheet piece at which a hole for accommodating the rotor sheet piece is formed, the stator sheet pieces and rotor sheet pieces can be blanked out from a single strip material with use of a single press machine and a single die machine.

In accordance with a further aspect of the method for producing laminated iron cores of the present invention, in a first step, a rotor sheet piece having a predetermined outer periphery is blanked out from an inner diameter zone of a stator sheet piece, in a second step, pole teeth are formed at an inner periphery of a semi-stator sheet piece, in a third step, the pole teeth are pressed in a sheet thickness direction to form thin portions so as to extend the inner periphery radially inwardly, and in a fourth step, the inner periphery of the pole teeth is blanked out into a predetermined shape.

In the present invention, since the inner peripheral edge portion of the pole teeth is radially inwardly extended by the thin portions formed in the pole teeth, the blanking width becomes wide. As a result, when the semi-stator sheet piece is subjected along its inner peripheral edge portion to a blanking operation, generation of a 'scum riser' phenomenon or the like can be prevented in advance.

With the laminated iron core of the present invention, further, at least one of the stator sheet pieces of the stator and the rotor sheet pieces of the rotor is provided with the thin portions which are concentric therewith and obtained by pressing in the sheet thickness direction.

With the laminated iron core of the present invention, at least one of the stator and rotor sheet pieces is provided with the extended concentric thin portions and the blanking is carried out with use of the extended area. Thus, when the stator sheet piece is blanked out along its inner peripheral edge portion or the rotor sheet piece is blanked out along its outer peripheral edge portion, generation of a 'scum riser' phenomenon or the like can be prevented in advance.

In the case of the laminated iron core of the present invention, since at least one of the stator and rotor sheet pieces is provided with extended concentric thin portions and the blanking is carried out with use of the extended area, the iron core pieces can be made excellent in flatness and the blanking can be carried out with the expanded blanking gap between the stator and rotor sheet pieces. As a result, the both iron core pieces can have good shapes regardless of the fact that the core pieces are provided with a multiplicity of teeth poles. Thus, when such iron core pieces thus formed are stacked, there can be obtained a laminated iron core which is highly excellent in such shape precision as squareness and parallelism.

BRIEF DESCRIPTION OF THE DRAWINGS

FIG. 4(*b*) is a cross-sectional view of a major portion of a die machine embodying a prior art iron core production method;

FIG. 5(*b*) is a perspective view of a major portion of a stator sheet piece made in accordance with the prior art iron core production method;

DESCRIPTION OF THE PREFERRED EMBODIMENTS

The present invention will be detailed with reference to the accompanying drawings.

Figure 1:
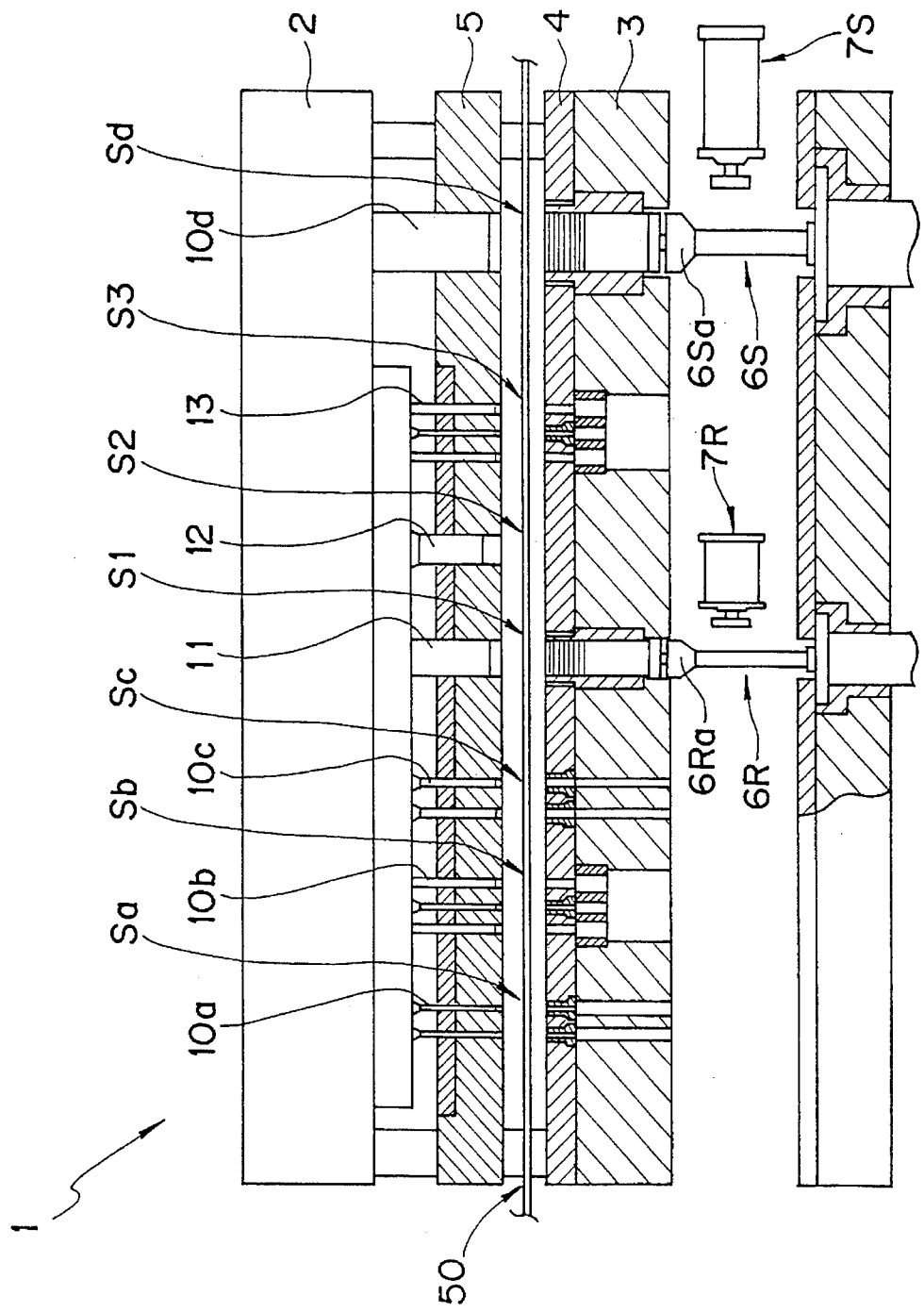
FIG. 1 is a general side view, partly in section, of a progressive die machine for producing laminated iron cores which embodies a method for producing laminated iron cores in accordance with the present invention.

Referring to FIG. 1, there is shown an example in which a method for producing laminated iron cores in accordance with the present invention is embodied in a progressive die machine 1 for producing the laminated iron cores which are used in a stator and rotor of a stepping motor. The die machine 1 includes upper die holder 2, on which mounted are different types of punches 10a, 10b and 10c as well as a rotor-sheet-piece blanking punch 11, a coining punch 12, a tooth tip blanking punch 13, and a stator-sheet-piece blanking punch 10d.

The die machine 1 further includes a die 4 mounted through a lower die holder 3 and a strip plate 5. Further included in the die machine 1 are processing stations Sa, Sb, Sc, a rotor-sheet-piece blanking station S1, a coining station S2, a tooth tip blanking station S3, and a stator-sheet-piece blanking station Sd, sequentially from the left side of the drawing.

Figure 8:
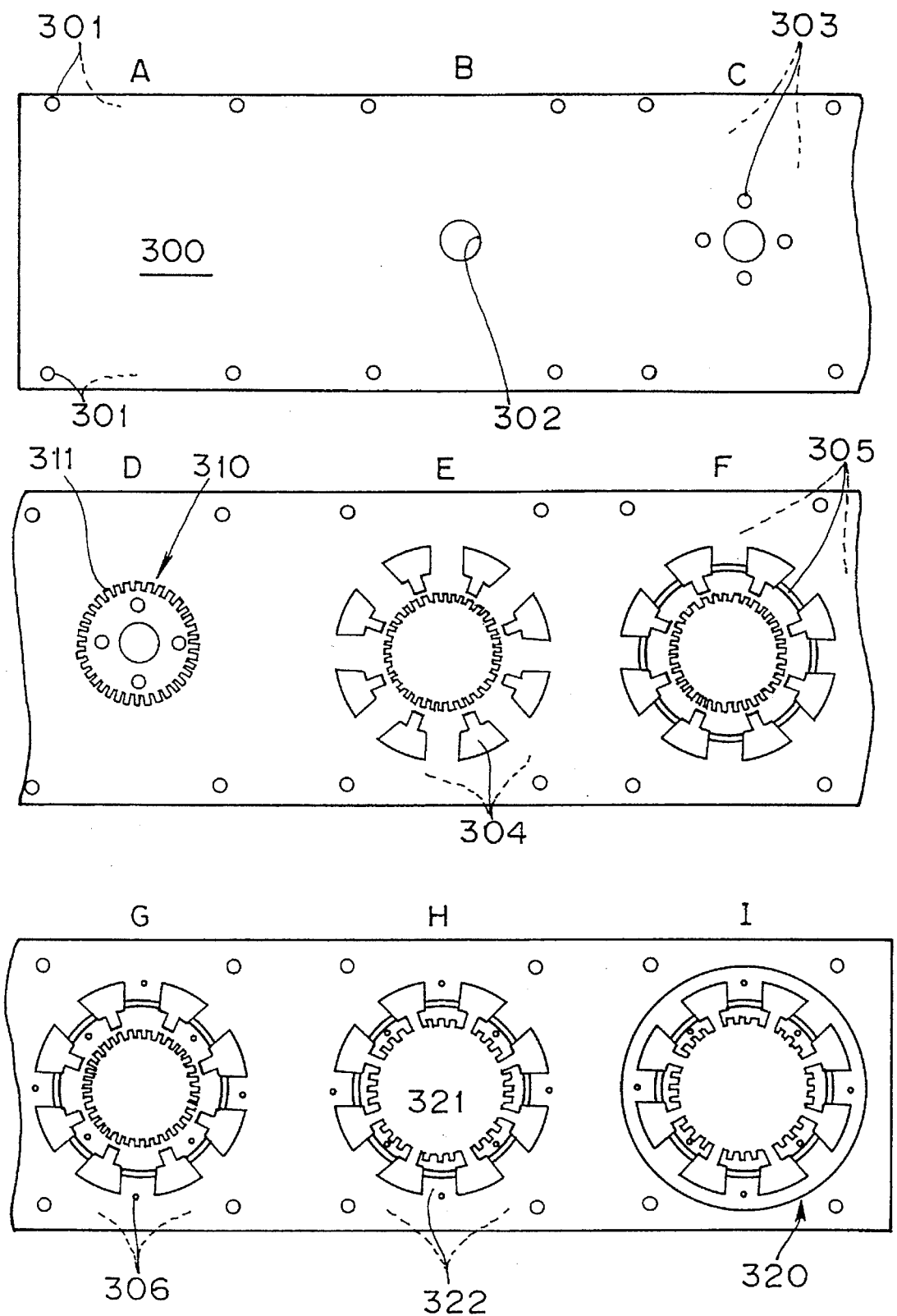
FIG. 8 shows a plan view of a strip material (metal thin sheet) for explaining an embodiment of the iron core production method of the present invention.

Meanwhile, the rotor-sheet-piece blanking station S1 has a lifter 6R for supporting the rotor sheet piece and a pusher 7R for pushing out the rotor; while, the stator-sheet-piece blanking station Sd has a lifter 6S for supporting the stator sheet piece and a pusher 7S for pushing out the stator. The appearance of the stator and rotor produced by the die machine 1 is basically the same as such stator and rotor A and B as shown in FIG. 8.

A strip material 50 transported into the die machine 1 of the above-mentioned structure is forwardly fed from the left side to the right of FIG. 1. At the above processing stations Sa, Sb, and Sc, first of all, the fed strip material is subjected to sequential processing operations to form therein pilot holes, a calking portion and a center hole in the rotor sheet piece.

Figure 2:
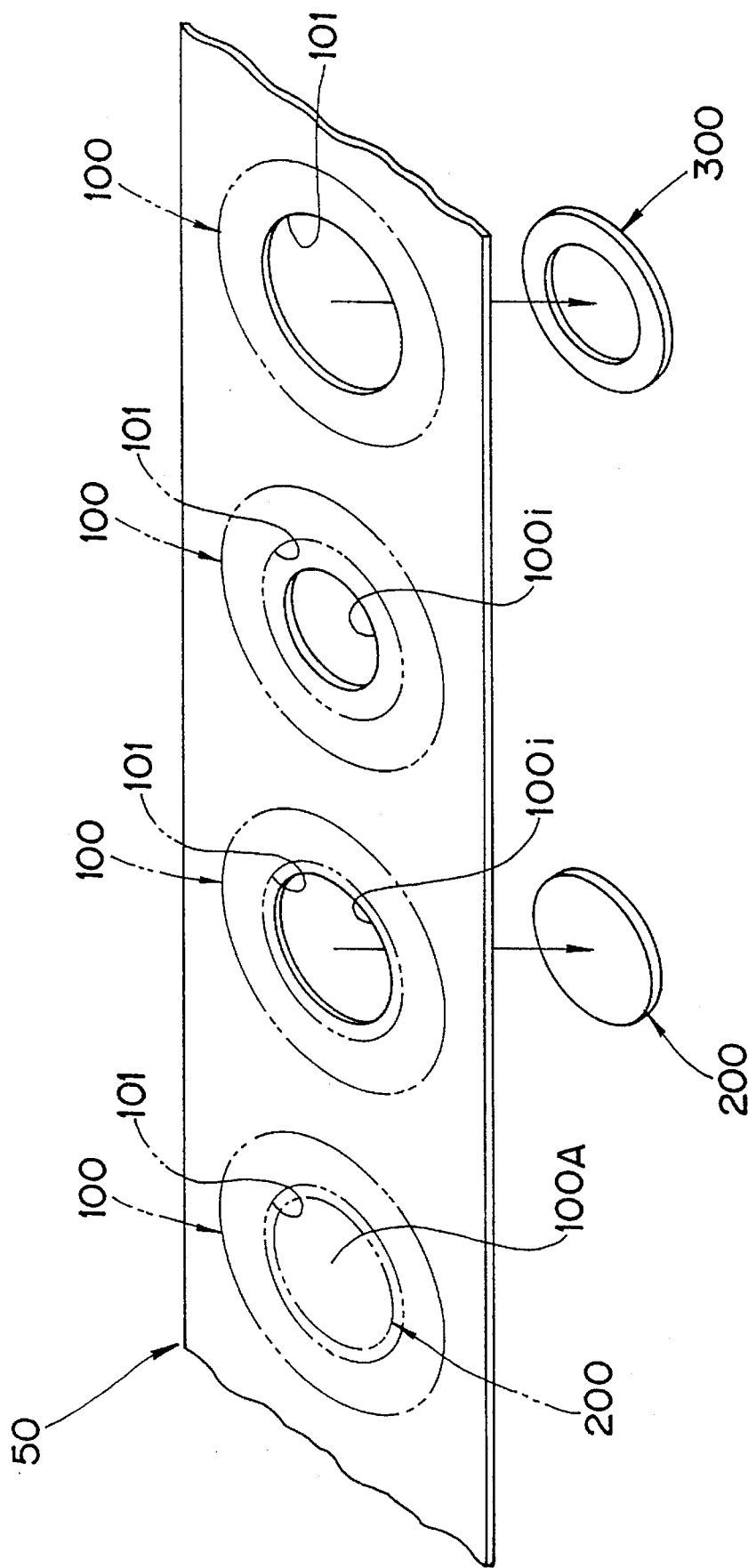
FIG. 2 is a perspective view conceptionally showing how to form stator sheet pieces in accordance with the iron core production method of the present invention.

Then the strip material 50 is subjected in the rotor-sheet-piece blanking station S1 to a punching operation by the rotor-sheet-piece blanking punch 11, whereby such a rotor sheet piece 200 as shown in FIG. 2 is punched out (first step).

At this stage, in more detail, the rotor sheet piece 200 is blanked out from an inner diameter zone 101A of a rotor accommodation hole 101 in a stator sheet piece 100 which in turn will be also later formed into a predetermined shape having small teeth as being concentric with the stator sheet piece 100, as shown in FIG. 2.

In this case, as obvious from FIG. 3(a) that, in a semi-stator sheet piece from which the stator sheet piece 100 of a predetermined shape is formed in the later step, that is, in the strip material left after the rotor sheet piece 200 was punched out; the narrowest portions between an inner peripheral edge portion 100i left after the rotor sheet piece 200 was blanked out and the rotor accommodation hole 101 to be later punched out, that is, projections 100ia facing a distal end of each small tooth 102 to be later formed at the edge portion of the rotor accommodation hole 101 are left with an extremely small width d1 (about 0.02 mm) corresponding to an air gap between the rotor and stator.

Next, in the strip material 50, the semi-stator sheet piece is subjected at its inner peripheral edge portions 100i to a pressing operation by the coining punch 12 in its sheet thickness direction (second step).

Figure 3A:
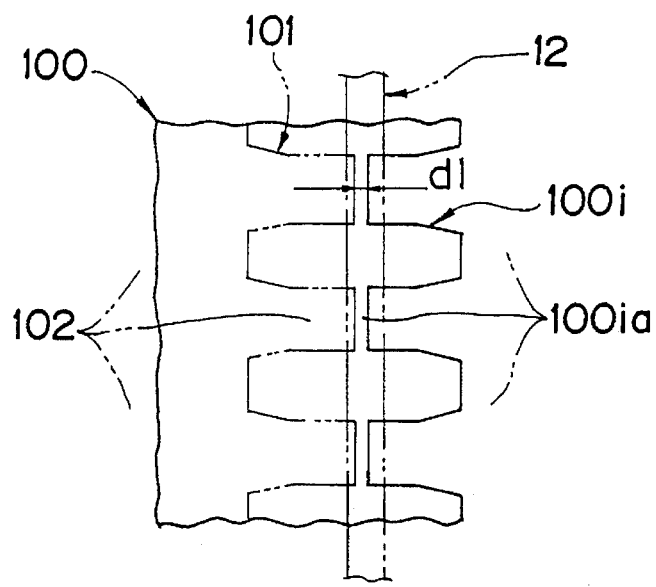
FIGS. 3(*a*), 3(*b*) and 3(*c*) are plan views of major portions of a stator sheet piece formed in accordance with the iron core production method of the present invention.

In this example, the coining punch 12, which has an annular punching surface, presses the inner peripheral edge portions 100i, i.e., such a zone of the inner peripheral edge portion 100i that includes the tip ends of the small teeth 102 to be later formed at the edge portion of the rotor accommodation hole 101, along its entire periphery, as shown in FIG. 3(a).

As a result, the inner peripheral edge portion 100i is pressed out inwardly in the radial direction of the stator sheet piece 100, as shown in FIG. 2 (the third illustration from the left).

Figure 3B:
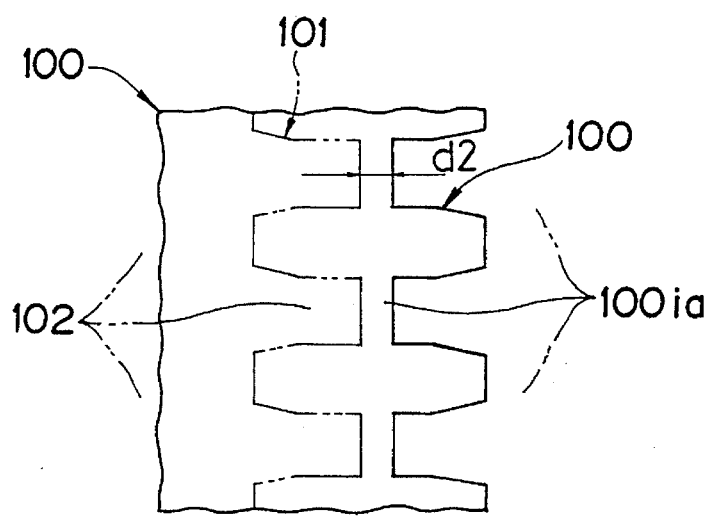

Since the inner peripheral edge portion 100i is pressed out inwardly in the radial direction (in the right direction in the drawing), the projection 100ia facing the tip ends of the small teeth 102 to be later formed can have a width d2 considerably wider than the air gap, as shown in FIG. 3(b).

In this connection, the pressing zone of the inner peripheral edge portion 100i is not limited to the zone including the tip ends of the small teeth 102 to be later formed at the edge portion of the rotor accommodation hole 101 but the center portion of the small teeth 102 to be later formed, i.e., the left side area of the portion being pressed by the coining punch 12 in FIG. 3(a) may be pressed. Alternatively, the entire edge area of the inner peripheral edge portion 100i extending inwardly in the radial direction from the base portions of the small teeth 102 may be pressed.

It goes without saying that, even when either one of the above pressing zones is pressed, the inner peripheral edge portion 100i is pressed out inwardly in the radial direction from such a state as shown in FIG. 8(a) to such a state as shown in FIG. 3(b), whereby the width of the projections 100ia facing the tip ends of the small teeth 102 can be made much wider than the air gap.

It is also possible, in place of the coining punch 12, to provide a plane-shaped projection corresponding to the coining punch 12 on the lower surface of the strip plate 5, for processing the stator sheet piece 100 by this projection.

In the tooth tip blanking station S3, the strip material (semi-stator sheet piece) 50 is subjected to a punching operation by the tooth tip blanking punch 13 so that such a rotor accommodation hole 101 as shown in FIG. 2 (right end) is made inside the inner peripheral edge portion 100i (third step).

Figure 3C:
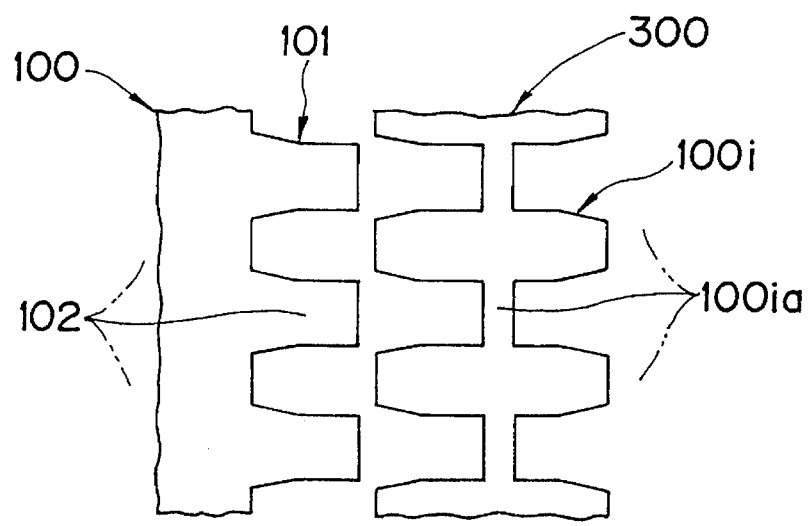

As shown in FIG. 3(c), when the rotor accommodation hole 101 having a multiplicity of the small teeth 102 is made, the above inner peripheral edge portion 100i is punched off as a punched-out scum 300. In this case, even the narrowest portions 100ia in the punched-out scum 300 is much wider than the above air gap as mentioned above.

Figure 4:
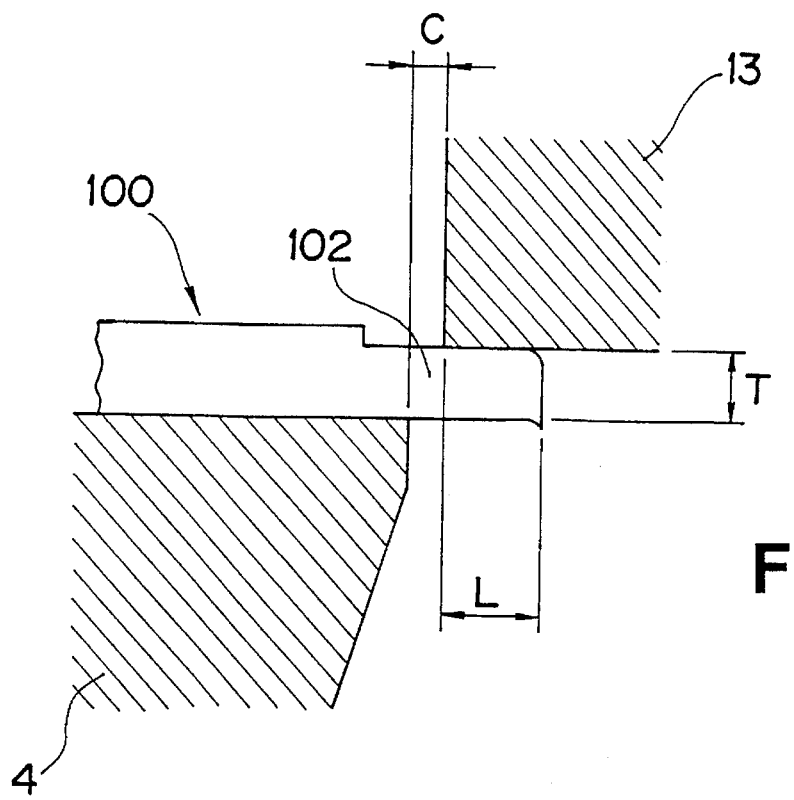
FIG. 4(*a*) is a cross-sectional view of a major portion of a die machine embodying the iron core production method of the present invention.
Figure 4:
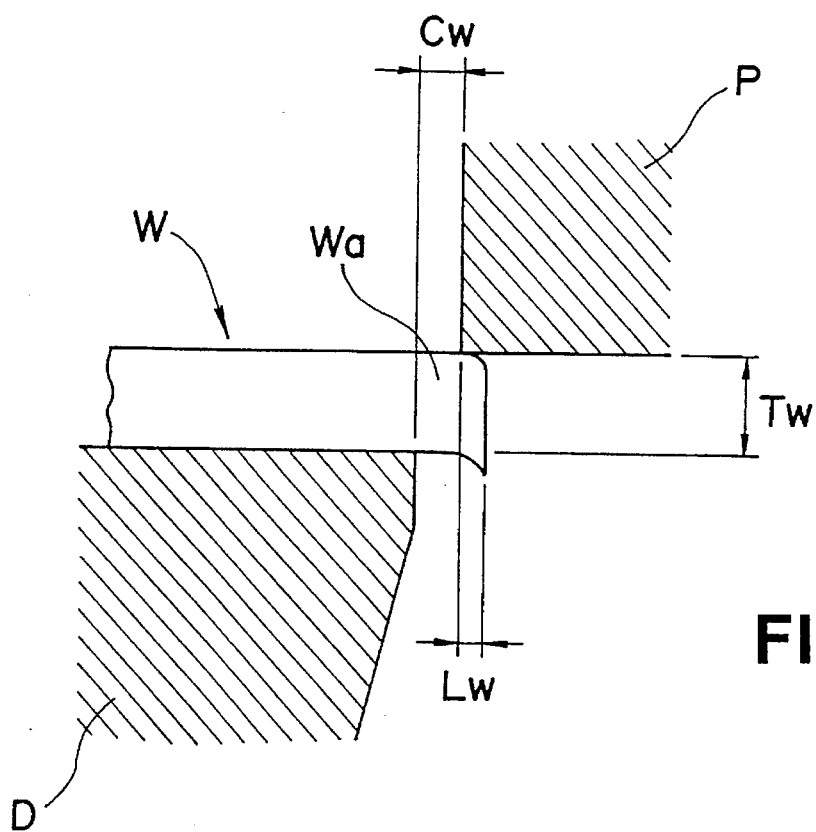

In other words, a punch-off width Lw to a semi-stator sheet piece W must be set only to correspond to the air gap in such a prior art die machine H having a die D and a punch P as shown in FIG. 4(b); whereas, a punch-off width L can be set to be much greater than the dimension of the air gap by pressing the inner peripheral edge portion 100i of the strip material 50 or semi-stator sheet piece in the above second step in the die machine 1 embodying the method of the present invention.

In this way, since even the narrowest portions 100ia of the punched-out scum 300 can have a width much greater than the above air gap, the punched-out scum 300 can fall into the die 4 and lower die holder 3 in the form of a continuous ring without being undesirably broken, whereby generation of a 'scum riser' phenomenon can be suppressed and minimized.

Further, in the prior art die machine H shown in FIG. 4(b), since a sheet thickness Tw of small teeth Wa of the semi-stator sheet piece W is large, a clearance Cw between the die D and punch P must be set to be broad.

Figure 5A:
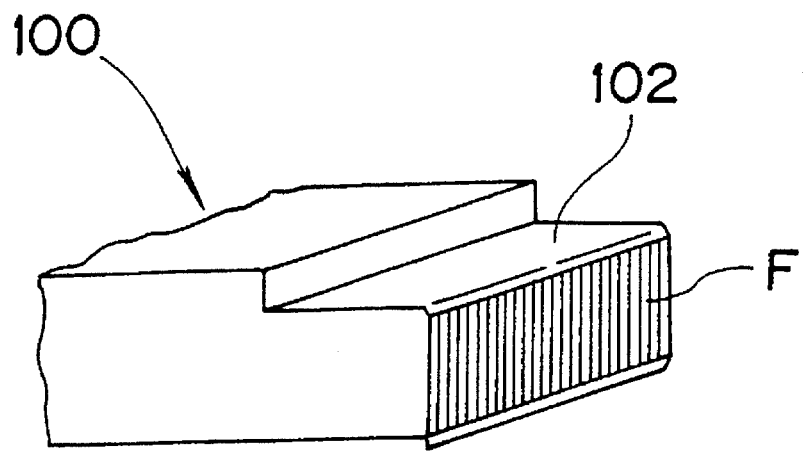
FIG. 5(*a*) is a perspective view of a major portion of the stator sheet piece made in accordance with the iron core production method of the present invention.
Figure 5B:
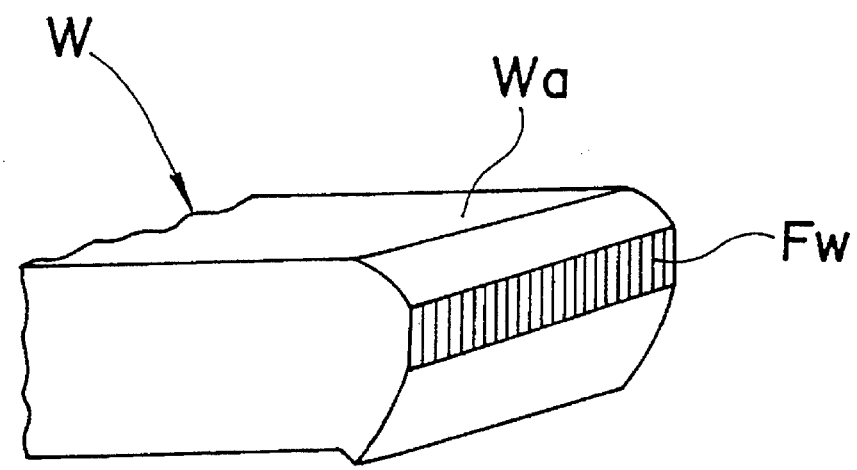

For this reason, as shown in FIG. 5(b), the tip end of the small teeth Wa has an extremely small shearing surface Fw and thus the area facing at the shortest distance with the tip end of the small teeth of the rotor becomes small.

In such a die machine 1 embodying the method of the present invention as shown in FIG. 4(a), the inner peripheral edge portion 100i of the strip material 50 or semi-stator sheet piece including the tip end of the small teeth 102 is pressed in the second step, so that the clearance C between the die 4 and tooth tip blanking punch 13 can be set to be small because the sheet thickness T of the small teeth 102 is smaller than that of the base portion of the strip material 50.

It is well known that the smaller the clearance is the larger the shearing surface is formed for the same material. As shown in FIG. 5(a), the tip end of the small teeth 102 in the stator sheet piece 100 can have a wide shearing surface F which is to be spaced by a shortest distance from the tip end of the small teeth of the rotor. As a result, the area of the shearing surface can be increased when compared with that of stator produced by the prior art method and therefore electrical characteristics of the resultant stepping motor can be remarkably improved.

After the rotor accommodation hole 101 is formed in the inner peripheral edge portion 100i at the tooth tip blanking station S3, the strip material 50 is subjected to an outer contour punching-off operation by the stator-sheet-piece draw/drop punch 10d to obtain the stator sheet piece 100 in the stator-sheet-piece blanking station Sd.

The rotor sheet pieces 200 punched out in the rotor-sheet-piece blanking station S1 are subjected in a receiving base 6Ra of the lifter 6R to sequential calking operation to obtain the rotor as a finished product. The finished product is pushed out from the receiving base 6Ra by the pusher 7R and then sent externally from the die machine 1.

Meanwhile, the stator sheet pieces 100 punched out in the stator-sheet-piece blanking station Sd are subjected in a receiving base 6Sa of the lifter 6S to sequential calking operations to obtain the stator as a finished product. The finished product is pushed out from the receiving base 6Sa by the pusher 7S and then sent externally from the die machine 1.

Figure 6:
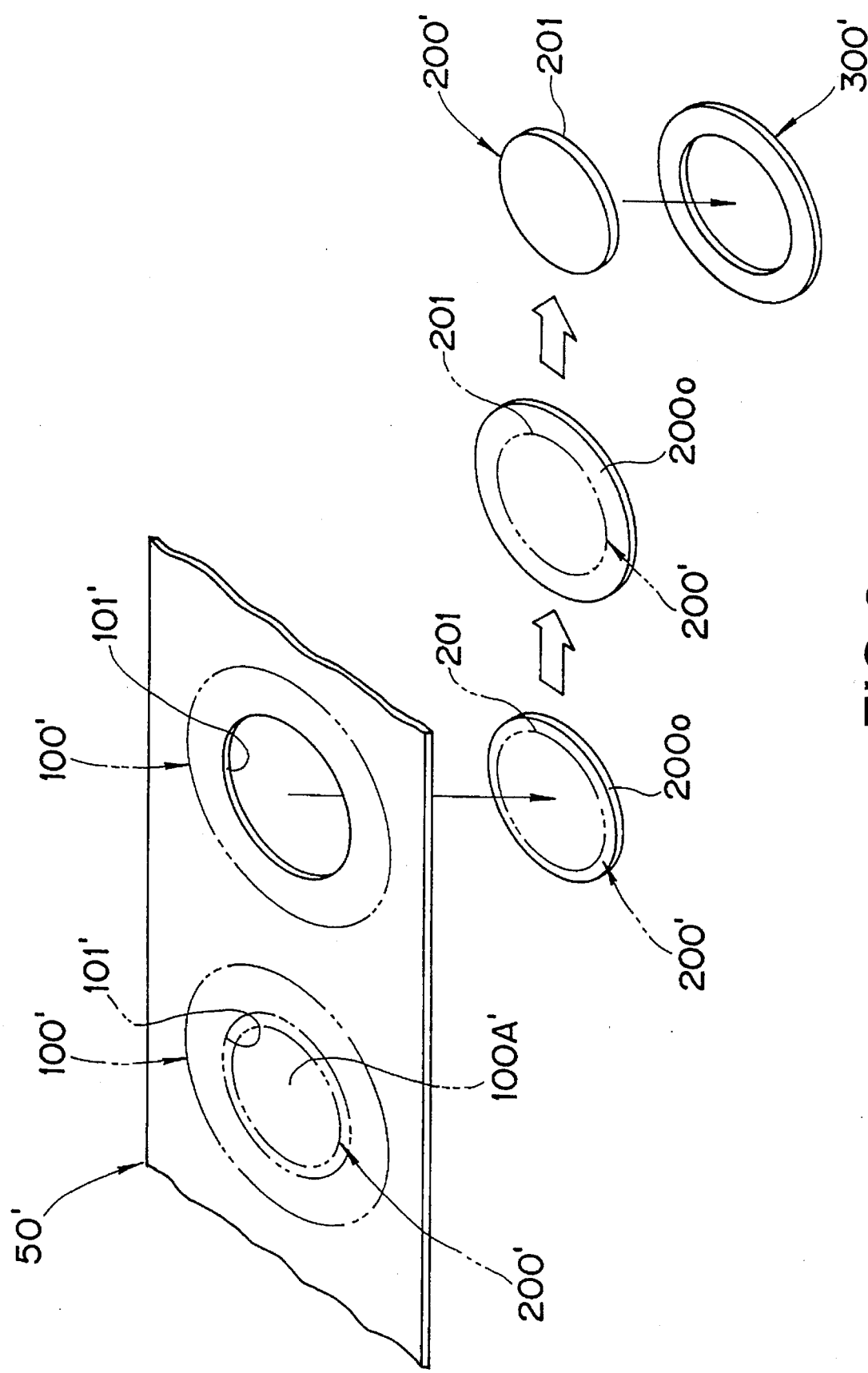
FIG. 6 is a perspective view conceptionally showing how to form rotor sheet pieces in accordance with the iron core production method of the present invention.

In such a method for producing laminated iron cores as shown in FIGS. 6 and 7, a strip material 50' is formed with pilot holes and calking portions, subjected to a blanking operation to cut off an inner diameter zone 100A' of a stator sheet piece 100' therefrom to obtain a rotor accommodation hole 101' of a predetermined shape having a multiplicity of small teeth, and then subjected to a blanking operation to obtain a semi-rotor sheet piece 200' from which a rotor sheet piece having a predetermined shape will be formed in the later step, as shown in FIG. 6 (first step).

At this stage, it will be seen from FIG. 7(a) that the narrowest portions of the semi-rotor sheet piece 200' between an outer peripheral edge portion 200o and a rotor piece outer periphery 201 to be later blanked, that is, portions 200oa facing the tip end of small teeth 202 formed at the edge portion of the rotor piece outer periphery 201 can have a small width d1' corresponding only to an air gap between the stator and rotor.

Next, the outer peripheral edge portion 200o of the semi-rotor sheet piece 200' is pressed in the sheet thickness direction so that the outer peripheral edge portion 200o is extended outwardly in the radial direction of the semi-rotor sheet piece 200' as shown in FIG. 6 (second step).

Figure 7A:
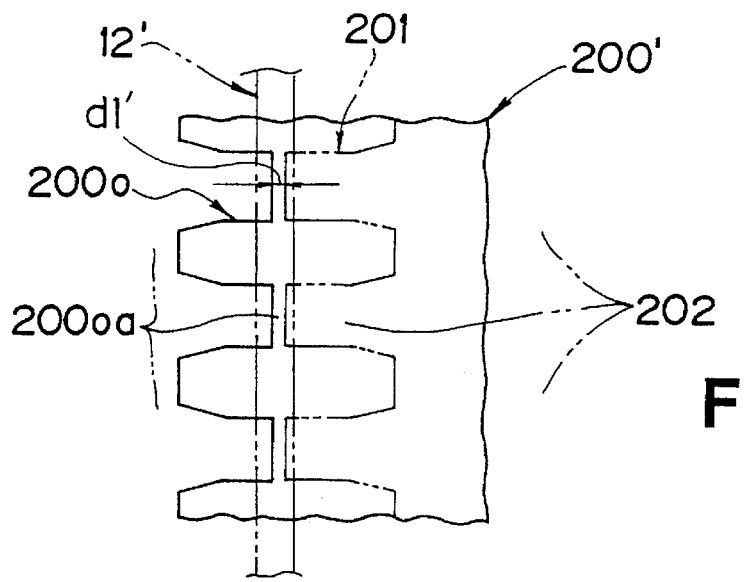
FIGS. 7(*a*), 7(*b*) and 7(*c*) are plan views of major portions of a rotor sheet piece formed in accordance with the iron core production method of the present invention.
Figure 7B:
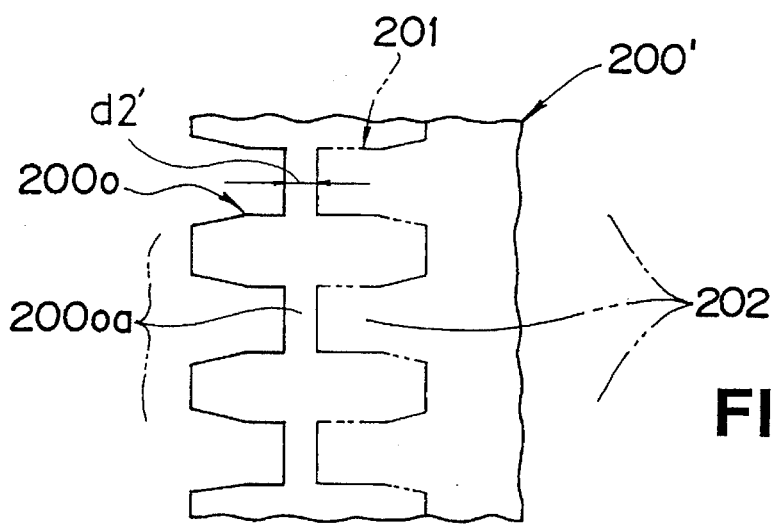

In this case, as shown in FIG. 7(a), the zone of the outer periphery 200o including the tip end of the small teeth 202 is pressed all over its entire periphery by a coining punch 12' to be thereby extended outwardly in the radial direction (in the left direction of the drawing), which results in that, the portions 200oa facing the tip end of the small teeth 202 have a width d2' greater than the air gap as shown in FIG. 7(b).

In this connection, the pressing zone of the outer peripheral edge portion 200o of the semi-rotor sheet piece 200' is not limited to the zone including the tip end of the small teeth 202. For example, center zones of the small teeth 202 of the outer peripheral edge portion 200o, that is, the right side zone of the area being pressed by the coining punch 12' in FIG. 7(a) may be pressed. Further, an entire zone of the edge portion ranged outwardly radially from the base portion of the small teeth 202 of the outer peripheral edge portion 200o may be pressed. In either case, the outer peripheral edge portion 200o of the semi-rotor sheet piece 200' is extended outwardly radially thereof from such a condition as shown in FIG. 7(a) into FIG. 7(b), whereby the portions 200oa facing the tip end of the small teeth 202 can have a width much greater than the air gap.

Then, as shown in FIG. 6, the outer peripheral edge portion 200o of the semi-rotor sheet piece 200' is subjected along its entire periphery to an outer contour punching operation to obtain the rotor piece outer periphery 201 of a predetermined shape provided with the small teeth 202 (third step).

Figure 7C:
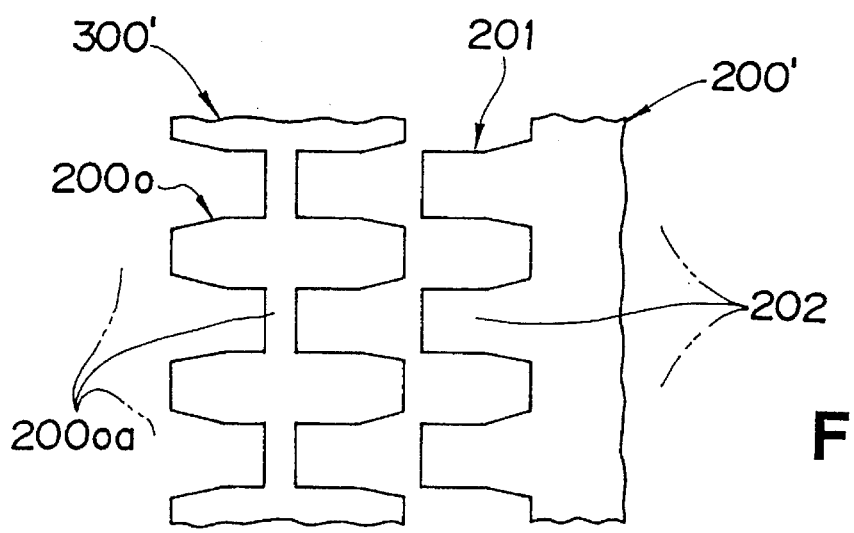

In this case, the outer peripheral edge portion 200o of the semi-rotor sheet piece 200' is punched off as a punched-out scum 300'. Since even the narrowest portions 200oa of the punched-out scum 300' has a width much greater than the air gap as shown in FIG. 7(c), the ring can fall into the die in the form of a continuous ring without being unwantedly broken and thus generation of such a 'scum riser' phenomenon can be suppressed and minimized.

In the above second step, the sheet thickness of the small teeth 202 is made small by pressing the outer peripheral edge portion 200o of the semi-rotor sheet piece 200', so that a clearance between the die and punch (not shown) can be set to be small. Accordingly, the tip end of the small teeth 202 of the semi-rotor sheet piece 200' can have a wide range of shearing surface, the area of the rotor spaced by the shortest distance from the tip end of the small teeth of the stator can be increased, and correspondingly the electrical characteristics of its resultant stepping motor can be improved.

The strip material 50' with the semi-rotor sheet piece 200' removed therefrom in the first step is subjected in a stator-sheet-piece blanking station (not shown) to an outer contour punching operation by a stator-sheet-piece blanking punch to obtain the stator sheet piece 100' of the predetermined shape.

The stator and rotor sheet pieces formed in such a manner as mentioned above are sequentially calked with each other into a stator product and a rotor product, which products are then sent outside the machine.

Although the present invention has been explained in connection with the example where the invention is applied to production of the stator and rotor of the stepping motor as shown in FIGS. 1 to 7, it goes without saying that the iron core production method of the present invention is not limited to the stator and rotor of the stepping motor but may be effectively applied to production of the stator and rotor of various types of electric motors.

As has been explained above, in accordance with the iron core production method of the present invention, since the rotor sheet piece is blanked into a predetermined outer shape from the inner diameter zone of the stator sheet piece in the first step and thereafter a semi-stator sheet piece is pressed in a sheet thickness direction to extend the inner peripheral edge portion inwardly radially in the second step, when the inner peripheral edge portion of the semi-stator sheet piece is subjected to the blanking operation along its entire periphery to make the rotor accommodation hole in the inner peripheral edge portion in the third step, a sufficient blanking allowance can be secured.

Further, in accordance with the iron core production method of the present invention, since the strip material is subjected to the punching operation of the predetermined shape to make the rotor accommodation hole in the stator sheet piece and to form the semi-rotor sheet piece in the first step, and then the semi-rotor sheet piece is subjected to the pressing operation in the sheet thickness direction to extend the outer peripheral edge portion radially outwardly in the second step, when the outer peripheral edge portion of the semi-rotor sheet piece is subjected to the punching operation of the predetermined shape in the third step, a sufficient blanking allowance can be secured.

That is, in accordance with the iron core production method of the present invention, when the rotor sheet piece is subjected to the punching operation by utilizing the inner diameter zone of the stator sheet piece at which the rotor accommodation hole is formed, a large punching width at the time of punching the inner or outer peripheral edge portion of the semi-stator sheet piece or the semi-rotor sheet piece can be obtained. As a result, the punched-out ring can drop into the lower die in the form of a continuous and wide ring without being unwantedly broken as separated each other, whereby generation of such a 'scum riser' phenomenon can be suppressed and thus product failure caused by such scum riser at the time of the punching operation can be prevented in advance.

In other words, with such an arrangement of the present invention as mentioned above, the rotor sheet piece can be punched by utilizing the inner diameter zone of the stator sheet piece at which the rotor accommodation hole is formed while preventing incurrence of product failure, and both the stator and rotor sheet pieces can be punched out from a single strip material with use of a single press machine and a single die machine.

As a result, upon production of a stator and a rotor in one type of stepping motor, when compared with the prior art iron core production method requiring two die machines and two press machines, the method of the present invention can remarkably improve the material yield and therefore can suppress and minimize unwanted increase of the production costs.

Figure 9:
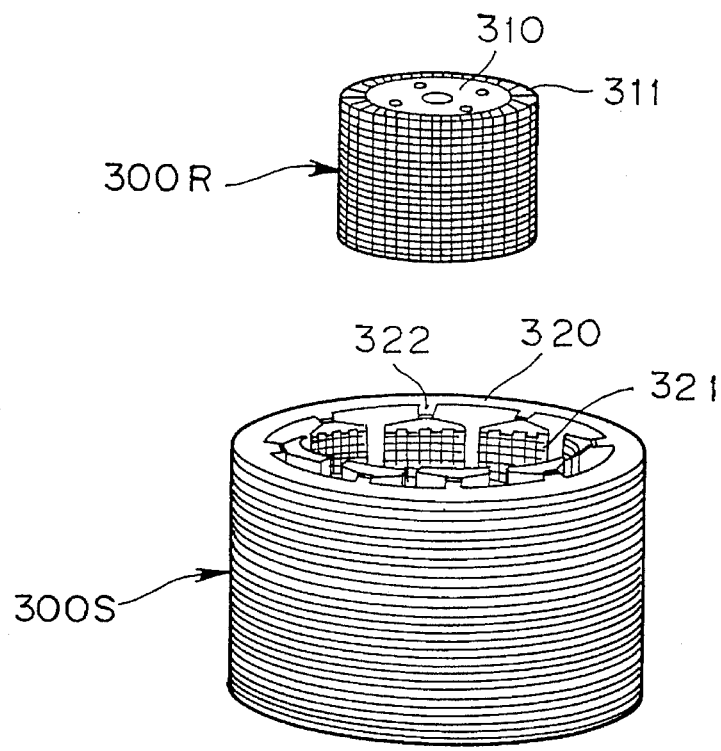
FIG. 9 shows perspective views showing a stator and a rotor of a laminated iron core of the present invention.
Figure 10:
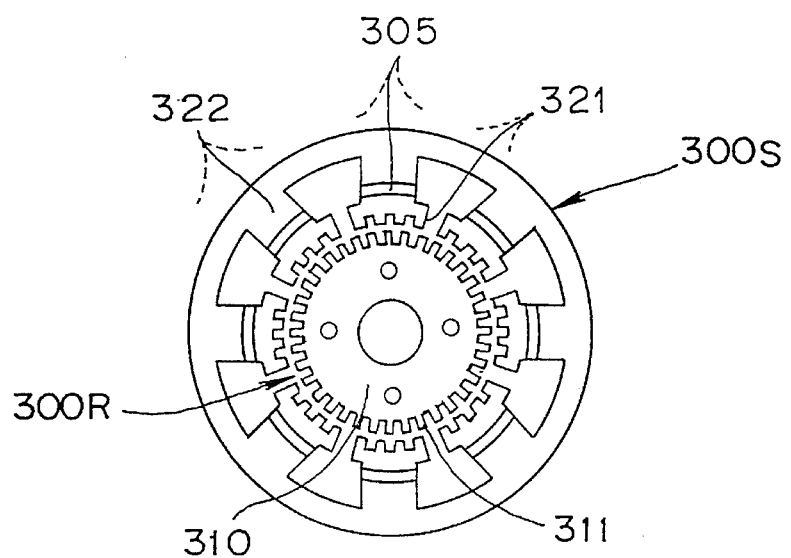
FIG. 10 is a plan view of the laminated iron core of the present invention.

FIGS. 8 to 10 show another embodiment of the present invention. In FIG. 8, reference numeral 300 denotes a metal thin sheet material from which rotor and stator sheet pieces are to be blanked, 301 pilot holes punched in a station A, 302 a shaft hole punched in a station B, 303 round calking portions formed in a station C.

The round calking portions 303 are fully punched as through holes in the first one (lowermost) of the laminated rotor sheet pieces and are half-blanked in the rotor sheet pieces numbered from the second to a predetermined number. The through hole punching and half-blanking are carried out, for example, by changing the projection amount of a punch (not shown). In this connection, the shape of the round calking portions 303 are not restricted to the round shape, but such any shape as square, V-shape or half-slit may be employed.

In a station D, the metal thin sheet 300 is subjected to a blanking operation to obtain a rotor sheet piece 310 and such rotor sheet pieces 310 are stacked and calked. At the time of stacking the rotor sheet pieces 310, the stacking can be either of a direct stacking or a rotary stacking. Further, the rotor sheet piece 310 is formed at its outer periphery with small teeth 311 by punching.

In a station E, the metal thin sheet 300 as a semistator sheet piece is subjected to a punching operation to form slots 304 therein. Thereafter, in locations of the semi-stator sheet piece to be later formed as portions of a stator sheet piece, thin portions 305 concentric with the outer contour of the rotor sheet piece 310 are formed by reducing the sheet thickness by way of pressing, nipping or striking.

In a station F, the concentric thin portions 305 are formed with use of, e.g., an annular punch. Although the forming position of the thin portions 305 can be any location where the stator sheet piece is to be formed, it is preferable that the thin forming portion be formed inside the inner diameter end so that small teeth 321 of a stator sheet piece 320 to be formed at the inner diameter end can face the small teeth 311 of the rotor sheet piece 310 as a dense stacked surface.

In a station G, then, in locations where the stator sheet piece is to be formed, round calking portions 306 are formed. The round calking portions 306 are fully punched as through holes in the first one (lowermost) of the laminated stator sheet pieces and are half-blanked in the stator sheet pieces numbered from the second to a predetermined number. The through hole punching and half-blanking are carried out, for example, by changing the projection amount of a punch as same in the round calking portions 303 of the rotor sheet piece 310. In this connection, the shape of the round calking portions 306 are not restricted to the round shape, but such any shape as square, V-shape or half-slit may be employed.

In a station H, the semi-stator sheet piece is subjected to a punching operation along its inner diameter to obtain small teeth 322. At this time, since the intended forming location of the stator sheet piece is made flat by extending the thin portions 305 toward the punched rotor sheet piece 310 as mentioned above; a sufficient punching scrap width can be secured and the stator sheet piece 320 has a high evenness or flatness and highly excellent in its shape.

Next, in a station I, the stator sheet piece 320 is subjected along its outer diameter to a punching operation. Such stator sheet pieces 320 are stacked and calked. In this connection, the stacking of the stator sheet piece 320 is carried out by way of a direct stacking or rotary stacking.

When the rotor sheet pieces 310 are stacked and calked, such a rotor 300R as shown in FIG. 9 is constructed; while, when the stator sheet pieces 320 are stacked and calked, such a stator 300S as shown in FIG. 9 is constructed.

Windings (not shown) are applied to the stator 300S and the rotor 300R is inserted into the central opening of the stator 300S, as shown in FIG. 10.

In this example, the small teeth 322 of the stator sheet piece 320 are provided with the thin portions 305 pressed and extended in the aforementioned manner, so that, when the stator sheet pieces 320 are laminated flatly and closely, the resultant stator 300 is excellent in its shape and attitude, whereby a narrow air gap between the stator 300S and rotor 300R can be accurately secured and a resultant laminated iron core can exhibit excellent electric characteristics.

Although the thin portions 305 of the stator sheet piece 320 provide a slight air gap in the laminates of the stator 300S, since magnetic fluxes from the rotor 300R pass through the closely-layered small teeth 322 and also through the sheet pieces of the iron core having a small resistance, the electric characteristics are not deteriorated due to the presence of the aforementioned air gap.

In the foregoing embodiment, the rotor sheet piece is blanked from the metal thin sheet, then concentric thin portions are formed on the stator sheet piece side and the stator sheet piece is blanked from the metal thin sheet. However, it goes without saying that in place of the above arrangement, such an arrangement that concentric thin portions are formed on the rotor sheet piece blanked from the metal thin sheet and after the thin portions are extended, the rotor sheet piece is blanked and stacked. That is, the laminated iron core of the rotor sheet pieces having the thin portions can exhibit the same function and effect as that of the laminated iron core as mentioned above.

Further, the thin portions may be provided not only either one of the rotor and stator sheet pieces but also to the both as necessary. Even the latter case can exhibit substantially the same function and effect as those of the above case, as a matter of course.

As has been mentioned above, in the laminated iron core Of the present invention, either one of the stator sheet pieces of the stator and the rotor sheet pieces of the rotor is provided with the concentric thin portions, the thin portions are pressed and extended, and then the resultant sheet pieces are subjected to the blanking operation utilizing the extended area. As a result, the resultant iron core pieces can be excellent in their flatness. Further, since the blanking operation is carried out under such a condition that the blanking gap between the stator and rotor sheet pieces is expanded, both the iron core pieces can have a good shape regardless of the fact that the iron core pieces are provided with a multiplicity of pole teeth.

As a result, when the iron core sheet pieces thus formed are stacked, there can be obtained a laminated iron core which is highly excellent in the accuracy of its shape such as squareness and parallelism, that is, which can make the air gap small, suppress generation of unnecessary movement, and realize highly-accurate rotational operation.

Shown in FIGS. 11 to 14 is a further embodiment of the iron core production method of the present invention.

Figure 11:
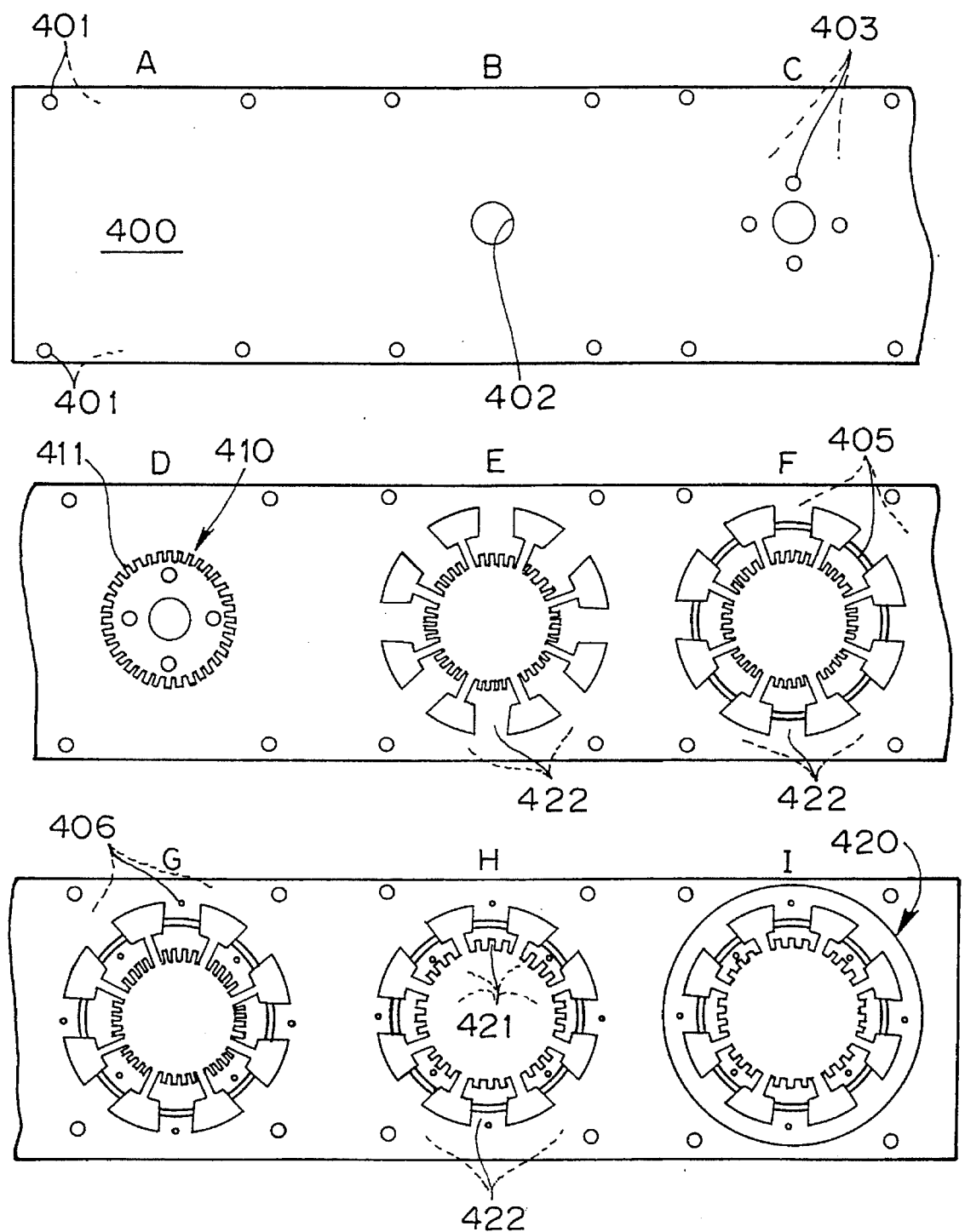
FIG. 11 shows a plan view of a strip material (metal thin sheet) for explaining another embodiment of the iron core production method of the present invention.
Figure 12:
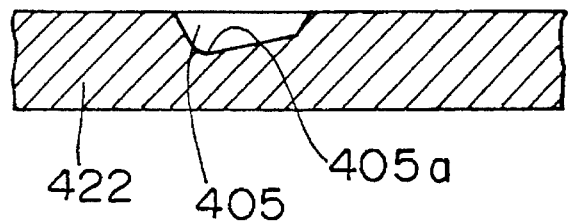
FIG. 12 is a cross-sectional view of a pole tooth of a stator sheet piece having a thin portion formed therein.

In FIG. 11, reference numeral 400 denotes a metal thin sheet, 401 pilot holes punched in a station A, 402 a shaft hole punched in a station B, 403 calking portions formed in a station C.

Further, numeral 410 denotes a rotor sheet piece. The rotor sheet piece 410, in a station D, is subjected along its periphery to a blanking operation while small teeth are formed on the periphery. Such rotor sheet pieces 410 are stacked and coupled to each other through the calking portions 403 to thereby form a rotor.

In a station E, the semi-stator sheet piece from which a stator sheet piece 420 having a predetermined shape is to be formed in the later step, i.e., the metal thin sheet 400 after the rotor sheet piece 410 is removed therefrom, is subjected to a blanking operation to obtain pole teeth 422 concentric with the previously-blanked rotor sheet piece 410. Thereafter, in a station F, portion of the above pole teeth 422 is pressed with use of a punch (not shown) to form thin portions 405 having a reduced thickness.

In this connection, after the thickness of the thin portions 405 is locally reduced, the pole teeth 422 should be extended efficiently and precisely toward their tip end, i.e., toward the remainder of the sheet after the rotor sheet piece was blanked. To this end, in this embodiment, the thin portion 405 is formed to have a deeper portion 405a on the side of the previously-blanked rotor sheet piece, i.e., on the side (left side in the drawing) of the pole teeth 422 close to the inner peripheral edge portion (in which small teeth are to be formed), as magnifiedly shown in FIG. 12.

Figure 13A:
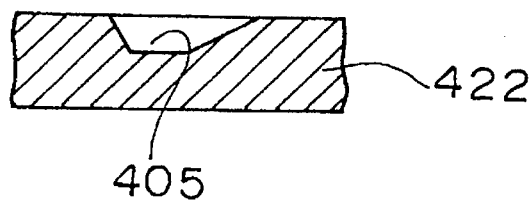
FIGS. 13(*a*), 13(*b*) and 13(*c*) show cross-sectional views of pole teeth having different examples of thin portions formed in the stator sheet pieces.
Figure 13B:
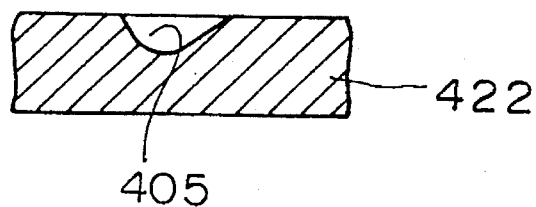
Figure 13C:
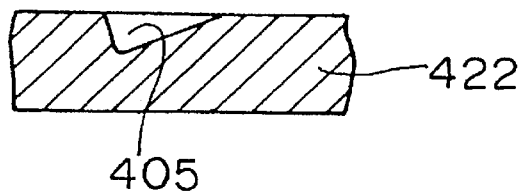

For the cross-sectional shape of the thin portion 405, such an angular shape as shown in FIG. 13(*a*), such a curve shape as shown in FIG. 13(*b*), such a slanted shape as shown in FIG. 13(*c*), or other suitable shape may be employed.

Figure 14A:
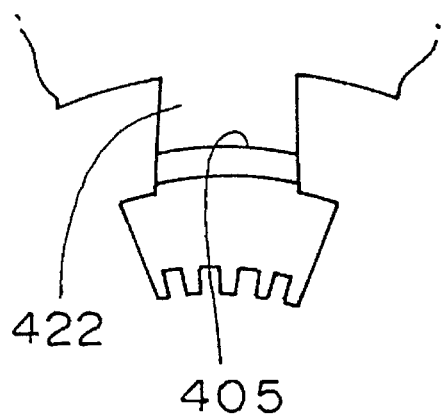
FIGS. 14(*a*), 14(*b*) and 14(*c*) show plan views of pole teeth having different examples of thin portions formed in the stator sheet pieces.
Figure 14B:
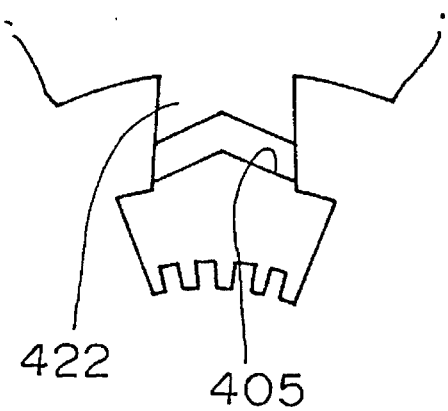
Figure 14C:
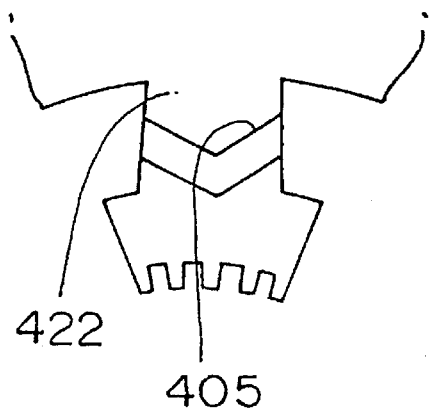

Further, for the planar shape of the thin portion 405, such a curve shape as shown in FIG. 14(*a*), such a mountain shape as shown in FIG. 14(*b*), such a V-letter shape as shown in FIG. 14(*c*), or other suitable shape may be employed.

As mentioned above, since the pole teeth 422 are provided with the thin portions 405, extension of the pole teeth 422 toward the remainder of the rotor sheet piece can be efficiently carried out accurately according to the reduced amount of the sheet and a blanking allowance in the later step can be expanded.

Portions of the sheet corresponding to the later formation of the stator sheet piece are provided with calking portions 406 in a station G shown in FIG. 11, after which the pole teeth 422 are subjected at their tip ends to a blanking operation to obtain small teeth 421 in a station H. As already explained above, since the sheet has the already expanded draft or blanking allowance, even when the blanking is carried out with the smallest air gap with respect to the rotor sheet piece 410, the blanking scrap can be made wide and thus the blanking will not involve any trouble.

Thereafter, in a station I, the semi-stator sheet piece is subjected to a blanking operation along the outer diameter periphery of the stator sheet piece 420. Such stator sheet pieces are stacked and calked to obtain a stator. The stator is applied with a winding, and then the above rotor is inserted into the center opening of the stator.

In the foregoing embodiment, since the pole teeth are provided with thin portions more deepened on its rotor sheet piece side and the tip end of the pole teeth is extended to provide a wide blanking allowance, even when the iron core pieces have a very narrow air gap, such problems as the blanked scrap being broken can be prevented.

Further, since the pole teeth are provided with deeper thin portions on the side of the later-to-be-blanked rotor sheet piece, the thin sheet can be easily extended and the adjustment of the extended length of the sheet can be realized with an accuracy of the order of submicrons. Further, since the thin portions of the pole teeth are pressed into an extended thin sheet having a reduced thickness, the resultant thin sheet has no unwanted wavy undulations thereon, whereby the stator sheet pieces can be closely or tightly stacked upon each other, which results in a laminated iron core which is high in its space factor and excellent in its electromagnetic characteristics.

In the foregoing embodiments, the metal thin sheet after the rotor sheet piece is blanked therefrom and before the stator sheet piece is blanked, that is, the semi-stator sheet piece, is partially pressed in the sheet thickness direction to form the thin portions and to provide the draft or blanking allowance. However, this method is excellent in the flatness of the iron core sheet and the squareness and parallelism of the laminated iron core, but has a danger that, since the formation of the thin portions causes the metal thin sheet to be extended in all directions, the width of the pole teeth for example in the stator sheet piece is made locally greater, which leads to the fact that the degree of alignment of the winding in the later winding operation is lowered and thus it becomes difficult to obtain a closely wound winding shape.

Figure 15:
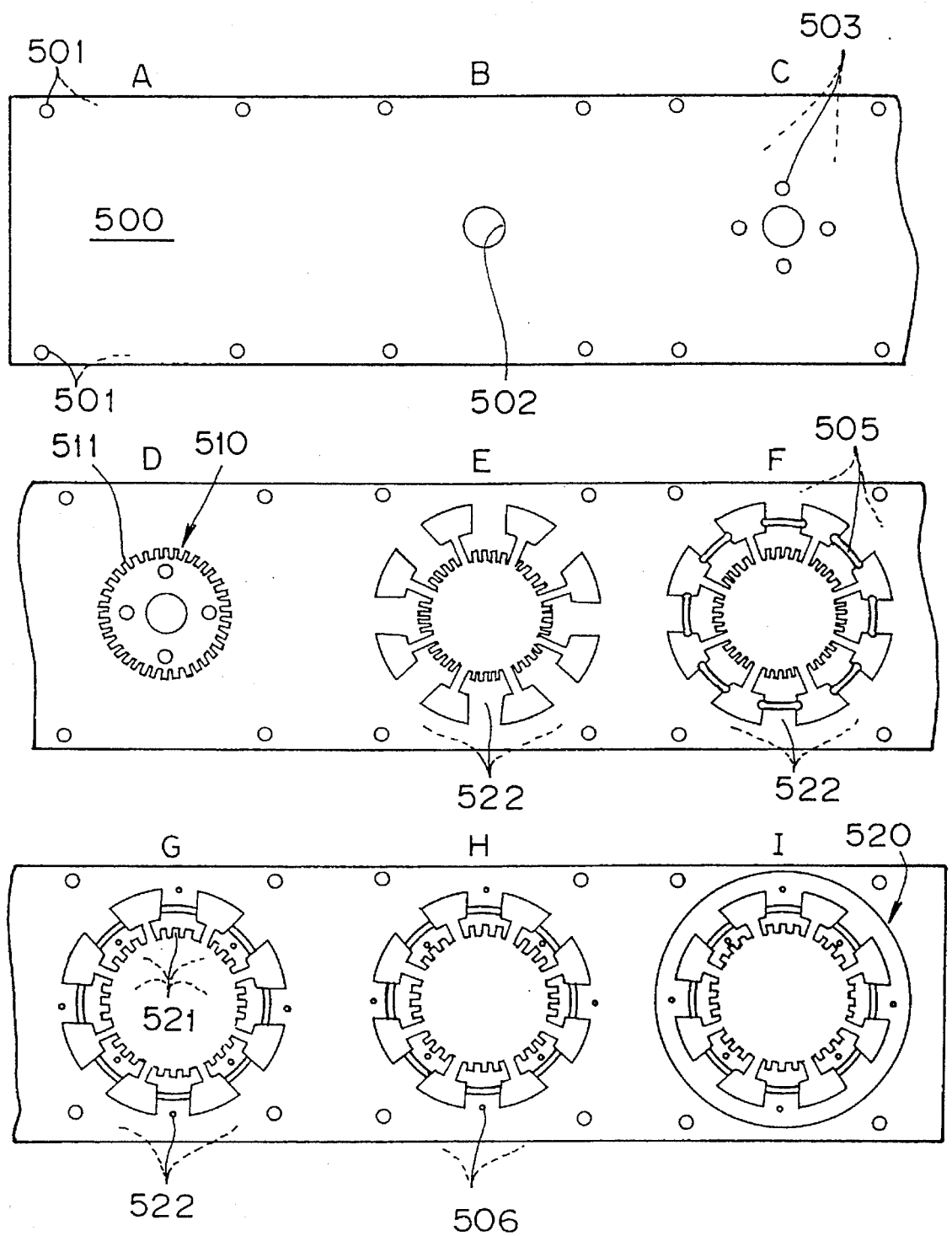
FIG. 15 shows a plan view of a strip material (metal thin sheet) for explaining a further embodiment of the iron core production method of the present invention.
Figure 16:
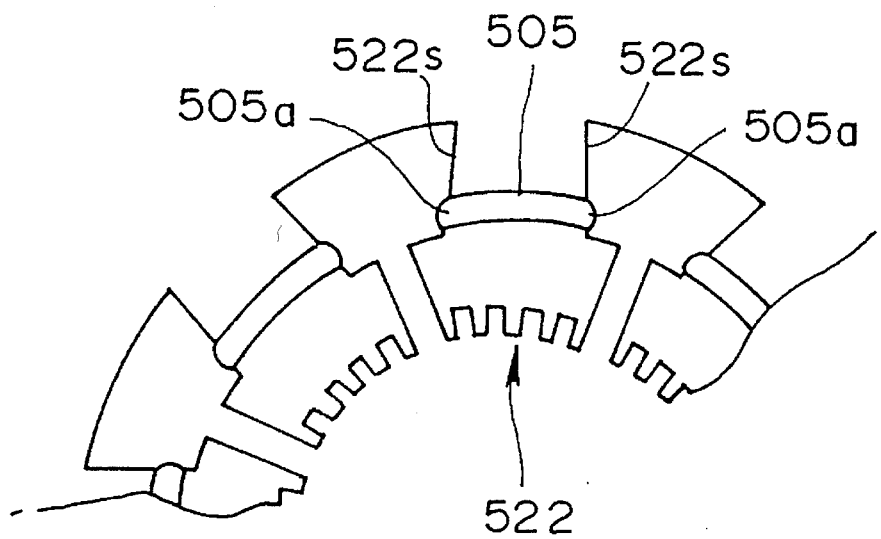
FIG. 16 is a plan view of a major portion of pole teeth of the stator sheet piece having thin portions formed therein.
Figure 17:
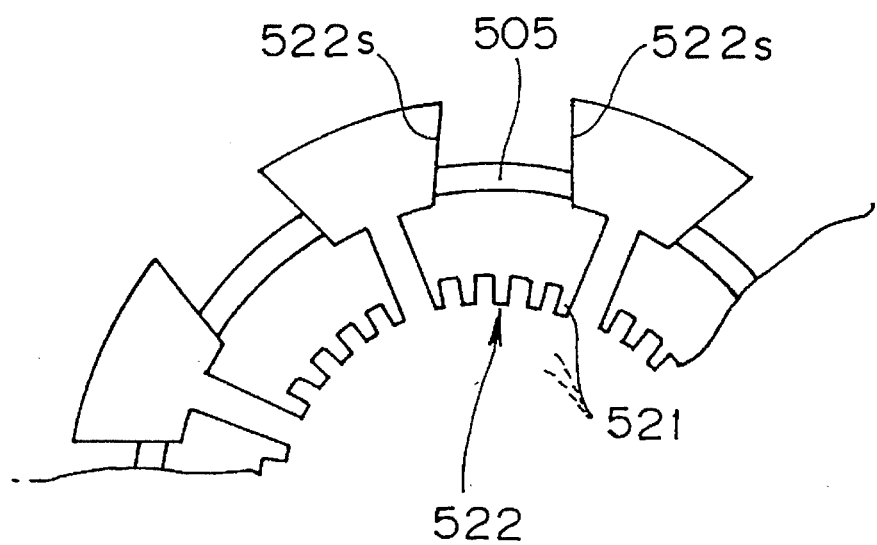
FIG. 17 is a plan view of a major portion of pole teeth of the stator sheet piece in which small teeth are punched and side edge portions are subjected to a finishing blanking operation.

FIGS. 15 to 17 show an embodiment of the iron core production method in accordance with the present invention, in which consideration is paid to the above circumstances.

In FIG. 15, reference numeral 500 denotes a metal thin sheet, 501 pilot holes punched out in a station A, 502 a shaft axis punched out in a station B, 503 calking portions formed in a station C. Further, numeral 510 denotes a rotor sheet piece. In a station D, such rotor sheet pieces 510 thus formed are subjected to a blanking operation to form small teeth 511 along their outer periphery, to a stacking operation and then to a calking operation through the calking portions 503, thus constituting a rotor.

In a station E, a semi-stator sheet piece from which a stator sheet piece 520 of a predetermined shape is to be blanked in the later step, that is, the metal thin sheet 500 after the rotor sheet piece 510 is removed, is subjected to a rough blanking operation to form pole teeth 522. In this case, the blanking is carried out so that the tip end of the pole teeth 522 coincides with the periphery of the remainder of the previously-blanked rotor sheet piece.

In a next station F, in order to make large the inner diameter blanking allowance of the metal thin sheet 500 as the semi-stator sheet piece, the metal thin sheet 500 is subjected to a pressing operation in its sheet thickness direction at a portion of the pole teeth 522 concentric with the rotor sheet piece 510 to form thin portions 505 and to extend the pole teeth 522 toward the side of the blanked rotor sheet piece 510. In this case, the thin portions 505 are formed by way of pressing, nipping with use of a punch, the formation width of the thin portions may be arbitrarily set, and the formation location of the thin portions 505 may also be arbitrarily set so long as it is positioned within the location of the stator sheet piece to be later formed.

Since the thin portions 505 are formed, the pole teeth 522 are extended toward the side of the blanked rotor sheet piece 510, the extension of the metal thin sheet 500 takes place also at side edge portions 522s of the pole teeth 522, which results in that local projections 505a are formed at the side edge portions 522s of the pole teeth 522 as shown in FIG. 16.

Since the projections 505a have adverse effect on a winding operation in the later step, the pole teeth 522 are subjected at their tip end to a blanking operation to form small teeth 521, and a finishing cut is carried out over the side edge portions 522s of the pole teeth 522 to thereby cut off the projections 505a as shown in FIG. 17 in a station G.

In this connection, such an arrangement may be allowed that the formation of the small teeth 521 to the pole teeth 522 and the finishing cut to the side edge portions 522s are carried out in respectively different stations.

In a station H of FIG. 15, calking portions 506 are formed at a location where the stator sheet piece is to be formed later. In a next station I, the remaining sheet is subjected along the outer diameter periphery of the stator sheet piece 520 to an blanking operation, the stator sheet pieces thus formed are stacked and calked to form a stator. A winding is applied to the stator and the aforementioned rotor is then inserted into the center opening of the stator.

In the foregoing embodiment, the metal thin sheet is subjected to the blanking operation to obtain the rotor sheet piece, to the rough blanking operation to form the pole teeth of the stator sheet piece, and then to the pressing operation in the sheet thickness direction at the portion of the pole teeth to form the thin portions and to extend the tip end of the pole teeth toward the side of the rotor sheet piece, whereby the blanking allowance of the stator sheet piece can be made large without deteriorating the flatness. As a result, at the time of blanking the tip end of the pole teeth (which tip end will form the inner end face of the stator sheet piece) to form the small teeth, it can be prevented that the scrap is broken during the blanking operation, whereby the stable blanking operation can be realized.

In the foregoing embodiment, further, the rough-blanked pole teeth are pressed in the sheet thickness direction to be extended and thereafter the blanking is carried out to form the side edge portions of the pole teeth, so that the unnecessary projections on the side edge portions of the pole teeth can be removed, the degree of alignment of the winding can be improved in the winding operation of the stator, the close winding shape can be obtained, whereby there can be obtained a laminated iron core which is excellent in rotation control characteristics.

FIGS. 18 to 21 show yet another embodiment of the iron core production method in accordance with the present invention.

Figure 18:
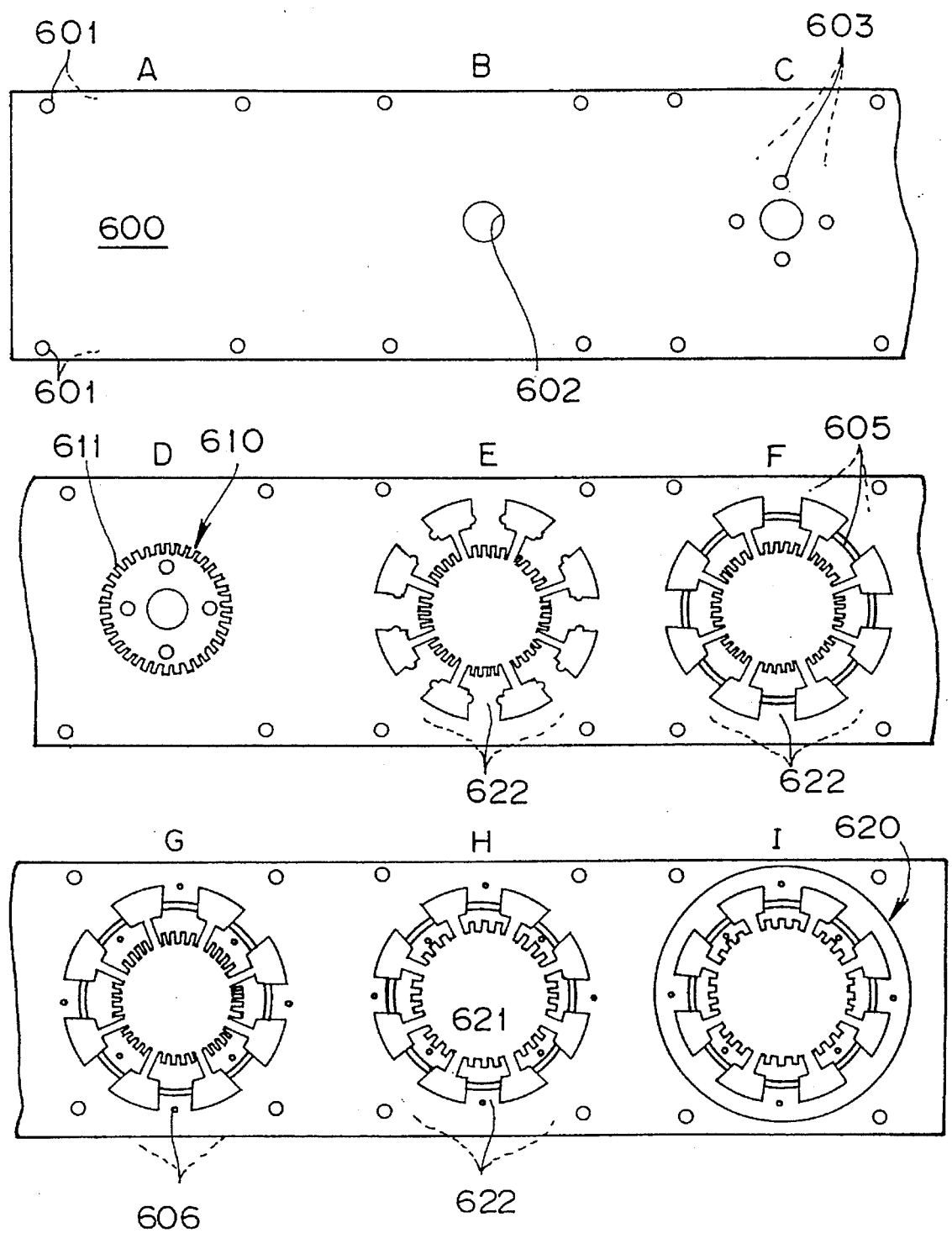
FIG. 18 shows a plan view of a strip material (metal thin sheet) for explaining yet another embodiment of the iron core production method of the present invention.
Figure 19:
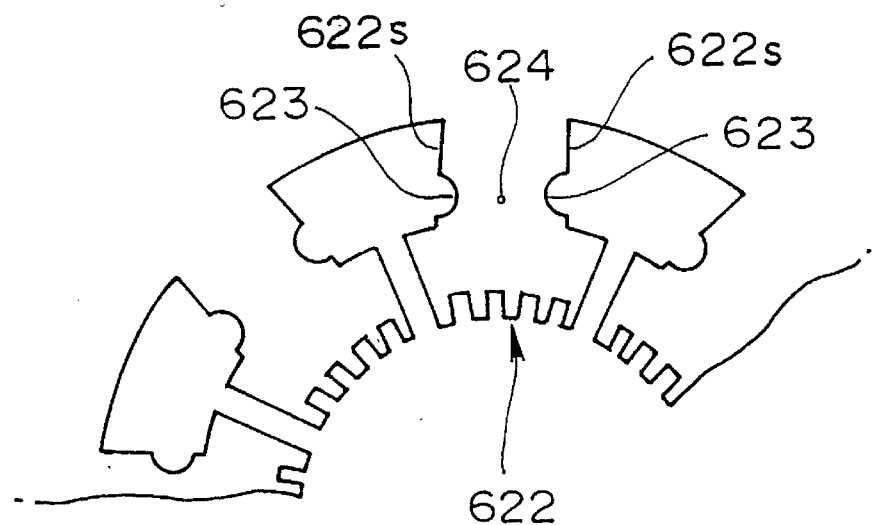
FIG. 19 is a plan view of a major portion of a stator sheet piece having narrow portions formed therein.

In FIG. 18, reference numeral 600 denotes a metal thin sheet, 601 pilot holes punched out in a station A, 602 a shaft hole punched out in a station, 603 calking portions formed in a station C.

Further, numeral 610 denotes a rotor sheet piece. In a station D, the rotor sheet piece 610 is obtained by subjecting the sheet along its outer periphery to a blanking operation, such rotor sheet pieces 610 thus blanked are stacked and coupled each other by means of the calking portions 603 to form a rotor.

In a station E, a semi-stator sheet piece from which a stator sheet piece 620 having a predetermined shape is blanked, that is, the a metal thin sheet 600 after the rotor sheet piece 610 is removed therefrom, is subjected to a blanking operation to form pole teeth 622 concentric with the previously-blanked rotor sheet piece 610. In this case, the blanking is carried out so that the tip end of the pole teeth 622 coincides with the outer periphery of the previously-blanked rotor sheet piece.

Both side edge portions 622s of each of the pole teeth 622 are provided therein with recesses 623 so that a narrow width portion 624 is defined in each of the pole teeth 622 by the recesses 623.

Figure 21A:
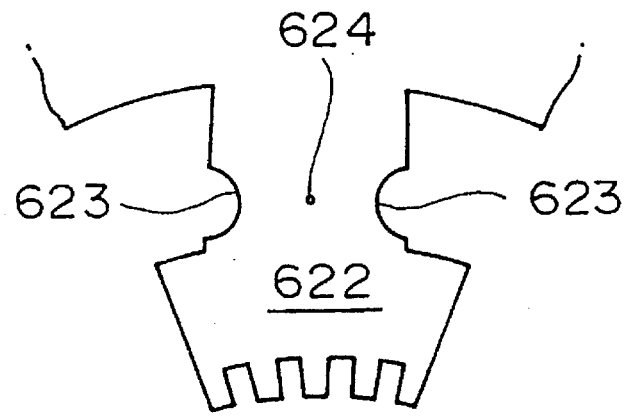
FIGS. 21(a), 21(b) and 21(c) show plan views of pole teeth of the stator sheet piece having different examples of narrow portions formed in stator sheet pieces.
Figure 21B:
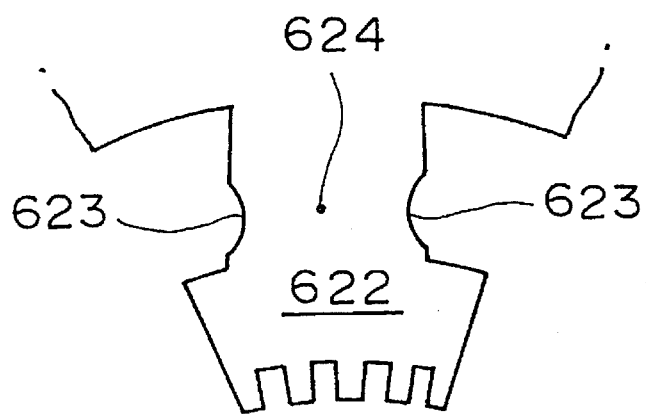
Figure 21C:
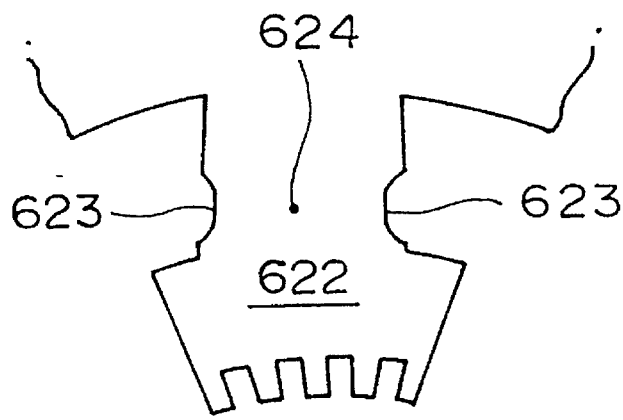
Figure 22:
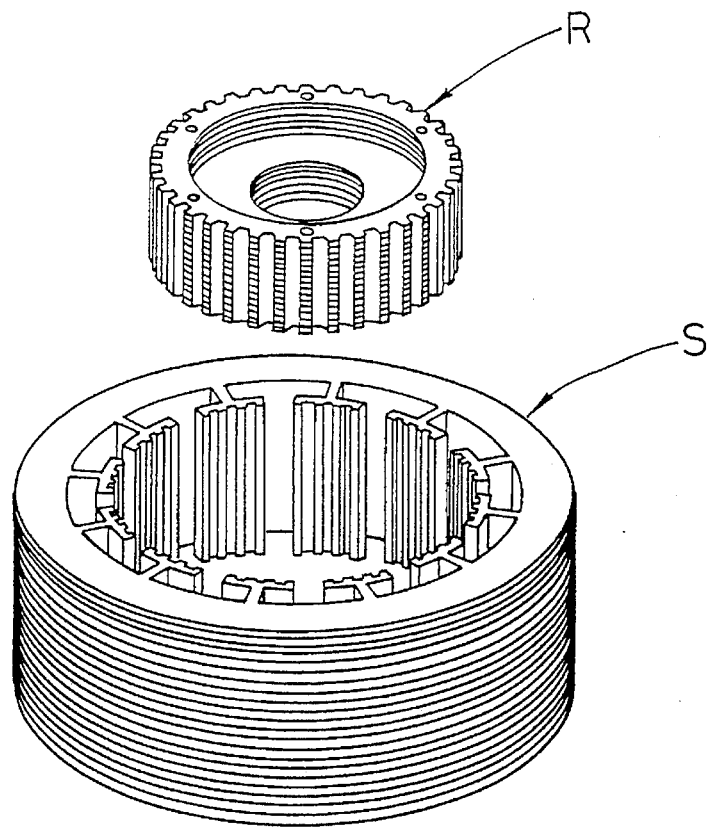
FIG. 22 shows an overall perspective view of a stator and a rotor of a stepping motor.
Figure 23:
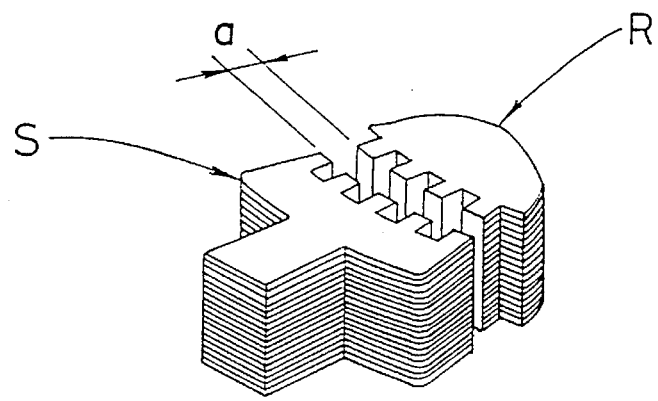
FIG. 23 is a perspective view of a major portion of the stator and rotor of the stepping motor.

For the shape of the recess 623 of the narrow width portion 624, such a semi-circular shape as shown in FIG. 21(a), such a bow shape as shown in FIG. 21(b), such a concave shape as shown in FIG. 21(c), or other suitable shape may be employed. Further, the dimension of the recesses 623 of the pole teeth in the length direction (in the radial direction of the stator sheet piece) of the pole teeth may also be arbitrarily set.

In a next station F of FIG. 18, the semi-stator sheet piece is subjected to a pressing operation with use of a punch or the like at the narrow width portion 624 of the pole teeth 622 to form thin portions 605 having a reduced sheet thickness, so that the tip end of the pole teeth 622 is extended toward the side of the blanked rotor sheet piece 610, whereby a blanking allowance at the inner diameter side of the stator sheet piece can be made large.

As a result, even when the blanking is carried out so that an air gap with respect to the aforementioned rotor sheet piece 610 is minimized, its blanked scrap can have a wide width and thus any troubles caused during the blanking operation can be avoided.

When the narrow width portions 624 are pressed in the sheet thickness direction to form the thin portions 605 in the narrow width portion 624, the pole teeth 622 are extended toward the side of the blanked rotor sheet piece 610 and the narrow width portion 624 is also extended in the width direction (in the circumferential direction of the stator sheet piece) of the pole teeth 622.

Figure 20:
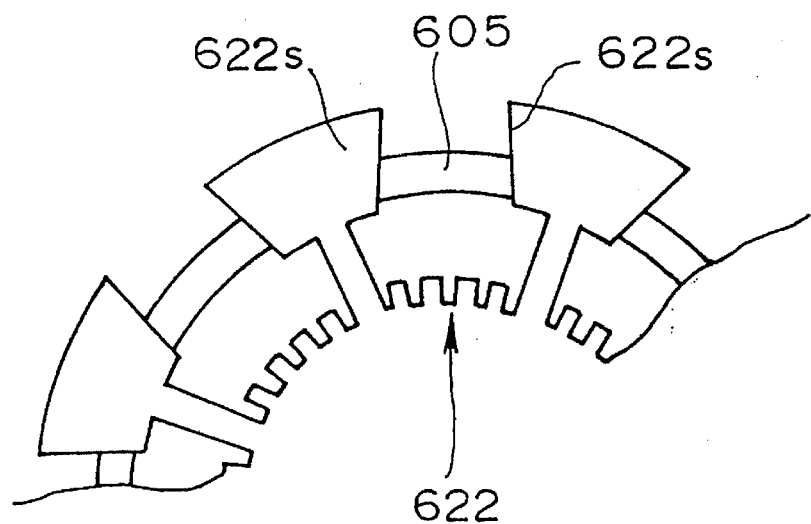
FIG. 20 is a plan view of a major portion of a stator sheet piece having thin portions formed therein.

However, since the aforementioned extended portions are absorbed by the recesses 623 formed in the both side edge portions 622s of the pole teeth 622 to be prevented from projecting from the both side edges of the pole teeth 622 as shown in FIG. 20, this will have no adverse effect on a winding operation of the latter step and a winding can be closely applied to the stator with a good alignment.

In a station G of FIG. 18, calking portions 606 are formed in the semi-stator sheet piece at a location where the stator sheet piece is to be later formed. In a next station H, the pole teeth 622 are subjected at their tip end to a blanking operation to form small teeth 621. At this stage, since the blanking allowance is made wide as mentioned above, even when the blanking is carried out with a smallest air gap of, e.g., 20 um with respect to the rotor sheet piece 610, this will not incur any troubles during the blanking because of the wide blanking scrap.

In a station I, next, the semi-stator sheet piece is subjected along the outer diameter periphery of the stator sheet piece 620 to a blanking operation. Such stator sheet pieces thus formed are stacked and calked to form a stator. A winding is applied to the stator and the aforementioned rotor is inserted into the center opening of the wound stator.

In the foregoing embodiment, the metal thin sheet after the rotor sheet piece is blanked is subjected to the blanking operation to form the pole teeth of the stator sheet piece partly having the narrow width portions, and then the narrow width portions are pressed in the sheet thickness direction to form the thin portions and to extend the tip end of the pole teeth toward the side of the blanked rotor sheet piece with the blanking allowance of the stator sheet piece made large without deterioration of the flatness, so that, when the semi-stator sheet piece is subjected to the blanking operation to form the small teeth at the tip end of the pole teeth as the inner end surface of the stator sheet piece, this blanking can be reliably performed without incurring any problems such as the scrap being broken during the blanking.

In the foregoing embodiment, further, since the narrow width portions in the pole teeth are pressed in the sheet thickness direction to form the thin portions, the extension of the pole teeth in the width direction during the pressing operation can be prevented from projecting from the side edge portions of the pole teeth and thus such projections can be prevented from unwantedly damaging the winding during the winding operation around the stator, whereby the winding alignment can be improved with the close winding shape and thus there can be obtained a laminated iron core which is good in electromagnetic characteristics and excellent in rotation control characteristics.

What is claimed is:

1. A method for producing a laminated iron core comprised of stacked stator sheet pieces in which each of said stator sheet pieces is formed from a thin strip of iron material, the method comprising:

a first step of blanking a generally circular rotor sheet piece from said strip, thereby producing a semi-stator sheet piece having a generally circular rotor accommodation hole and defining an annular zone of material adjacent said hole, said semi-stator sheet piece having a predetermined outer periphery shape;

a second step of pressing said semi-stator sheet piece in said zone in a sheet thickness direction to reduce the thickness of said material in said zone while extending the inner peripheral edge portions of the semi-stator sheet piece toward the center of said hole;

a third step of blanking the inner peripheral edge portion of the semi-stator sheet piece into a second predetermined shape along an entire circumference so as to form a resulting rotor accommodation hole;

a fourth step of blanking stator sheet pieces from said sheet of semi-stator pieces; and, a fifth step of laminating a plurality of said stator sheet pieces together to produce said laminated iron core.

2. The method as set forth in claim 1, wherein in the second step, said zone is sufficient to include at least tip ends of small teeth to be formed in said semi-stator sheet piece in the later step.

3. The method as set forth in claim 1, wherein in the second step, said zone is sufficient to include at least center portions of small teeth to be formed in the semi-stator sheet piece in the later step.

4. The method as set forth in claim 1, wherein in the second step, said zone is sufficient to include entire inner peripheral edge portions ranging radially inwardly from base portions of small teeth to be formed in the semi-stator sheet piece in the later step.

5. A method for producing a laminated iron core comprised of stacked rotor sheet pieces in which each of said rotor sheet pieces is formed from a thin strip of iron material, the method comprising:

a first step of blanking generally circular pieces from said strip to form semi-rotor sheet pieces which are to be formed into a predetermined shape of the rotor sheet piece in a later step;

a second step of pressing an annular zone located at the outer periphery of each said semi-rotor sheet piece in a sheet thickness direction to reduce the thickness of said material in said zone while extending the outer peripheral edge portions of each said semi-rotor sheet piece outwardly radially;

a third step of blanking the outer peripheral edge portions of each semi-rotor sheet piece into a predetermined shape along its entire circumference; and, a fourth step of laminating a plurality of said rotor sheet pieces together to produce said laminated iron core.

6. The method as set forth in claim 5, wherein in the second step, said zone is sufficient to form at least tip ends of small teeth to be formed in the semi-rotor sheet piece in the later step.

7. The method as set forth in claim 5, wherein in said second step, said semi-rotor sheet piece is pressed at said zone which is sufficient to form at least center portions of small teeth to be formed in the semi-rotor sheet piece in the later step.

8. The method as set forth in claim 5, wherein in the second step, the semi-rotor sheet piece is pressed at said zone which is sufficient to include the outer peripheral edge portions and the base portions of small teeth to be formed in the semi-rotor sheet piece in the later step.

9. A method for producing stator pieces for use in forming a laminated iron core, said stator pieces being formed from a thin strip of iron material, the method comprising:

a first step of blanking a generally circular rotor sheet piece from said strip, thereby producing a semi-stator sheet piece having a generally circular rotor accommodation hole and defining an annular zone of material adjacent said hole, said semi-stator sheet piece having a predetermined outer peripheral shape;

a second step of blanking pole teeth at inner peripheral edge portions of a semi-stator sheet piece which is to be formed into a predetermined shape of the stator sheet piece in a later step;

a third step of pressing the pole teeth in a sheet thickness direction to form reduced thickness portions extending across the width of the pole teeth and to also extend the inner peripheral edge portions of the pole teeth;

a fourth step of blanking the inner peripheral edge portions of the pole teeth into a predetermined shape.

10. The method as set forth in claim 9, wherein in the fourth step, the inner peripheral edge portions of the pole teeth are blanked into the predetermined shape and side peripheral edge portions of the pole teeth are also blanked into a predetermined shape.

11. The method as set forth in claim 9, wherein in the second step, the pole teeth are blanked and narrow width portions are formed along a circumference direction of the stator sheet piece at a predetermined location of each of said pole teeth, and in the third step, the narrow width portions are pressed to form the thin portions.

12. The method as set forth in any one of claims 9 to 11, wherein said thin portion is made deeper at a location closer to the inner peripheral edge portions of said pole teeth.

* * * * *